United States Patent
Winzer et al.

(10) Patent No.: US 9,995,879 B2
(45) Date of Patent: Jun. 12, 2018

(54) DYNAMIC SPATIAL-MODE ALLOCATION IN AN UNDER-ADDRESSED OPTICAL MIMO SYSTEM

(75) Inventors: Peter J. Winzer, Aberdeen, NJ (US); Gerard J. Foschini, Sayreville, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 540 days.

(21) Appl. No.: 13/332,588

(22) Filed: Dec. 21, 2011

(65) Prior Publication Data

US 2012/0224861 A1 Sep. 6, 2012

Related U.S. Application Data

(60) Provisional application No. 61/449,246, filed on Mar. 4, 2011.

(51) Int. Cl.
| | |
|---|---|
| H04B 10/04 | (2006.01) |
| H04B 10/25 | (2013.01) |
| G02B 6/14 | (2006.01) |
| G02B 6/42 | (2006.01) |
| H04J 14/04 | (2006.01) |
| H04B 10/2581 | (2013.01) |
| H04L 1/00 | (2006.01) |

(52) U.S. Cl.
CPC ........... *G02B 6/14* (2013.01); *H04B 10/2581* (2013.01); *H04J 14/04* (2013.01); *H04L 1/004* (2013.01)

(58) Field of Classification Search
CPC ........ H04B 10/2581; H04J 14/04; G02B 6/14
USPC ................................................ 398/140–143
See application file for complete search history.

(56) References Cited

U.S. PATENT DOCUMENTS

| | | | |
|---|---|---|---|
| 4,856,864 A | 8/1989 | Campbell et al. | |
| 5,283,780 A * | 2/1994 | Schuchman et al. | 370/312 |

(Continued)

FOREIGN PATENT DOCUMENTS

| | | |
|---|---|---|
| CN | 1613201 A | 5/2005 |
| CN | 201438229 U | 4/2010 |

(Continued)

OTHER PUBLICATIONS

International Search Report and Written Opinion; Mailed Mar. 28, 2013 for corresponding PCT Application No. PCT/US2012/026900.

(Continued)

*Primary Examiner* — Oommen Jacob
(74) *Attorney, Agent, or Firm* — Mendelsohn Dunleavy, P.C.; Yuri Gruzdkov

(57) ABSTRACT

The outage probability in an under-addressed optical MIMO system may be reduced by configuring a spatial-mode coupler at a transmitter and/or a spatial-mode separator at a receiver to dynamically change its spatial-mode configuration on a time scale that is shorter than the channel coherence time. Provided that the MIMO system employs an FEC code that has a sufficient error-correcting capacity for correcting the amount of errors corresponding to an average state of the MIMO channel established between the transmitter and receiver, this relatively fast dynamic change tends to reduce the frequency of events during which the number of errors per FEC-encoded block of data exceeds the error-correcting capacity of the FEC code.

15 Claims, 10 Drawing Sheets
(3 of 10 Drawing Sheet(s) Filed in Color)

(56) References Cited

U.S. PATENT DOCUMENTS

| | | | |
|---|---|---|---|
| 5,651,080 | A | 7/1997 | Chu et al. |
| 5,940,548 | A | 8/1999 | Yamada et al. |
| 6,341,023 | B1 | 1/2002 | Puc |
| 6,421,478 | B1 | 7/2002 | Paiam |
| 6,853,758 | B2 | 2/2005 | Ridgway et al. |
| 6,934,083 | B2 | 8/2005 | Damask |
| 7,051,261 | B1 | 5/2006 | Dhamankar |
| 7,437,082 | B1 | 10/2008 | Smith |
| 7,636,573 | B2 | 12/2009 | Walton et al. |
| 8,676,056 | B2 | 3/2014 | Gottwald |
| 2003/0021509 | A1 | 1/2003 | Yap et al. |
| 2003/0193889 | A1 | 10/2003 | Jacobsen |
| 2004/0042714 | A1* | 3/2004 | Ramachandran ............... 385/28 |
| 2005/0053324 | A1 | 3/2005 | Ridgway |
| 2005/0226547 | A1 | 10/2005 | Ridgway |
| 2007/0160321 | A1 | 7/2007 | Wu et al. |
| 2007/0195319 | A1* | 8/2007 | Kachanov et al. ........... 356/300 |
| 2009/0128883 | A1* | 5/2009 | Endo et al. .................... 359/290 |
| 2010/0080571 | A1 | 4/2010 | Akiyama et al. |
| 2010/0158521 | A1 | 6/2010 | Doerr et al. |
| 2010/0196005 | A1 | 8/2010 | Wada et al. |
| 2010/0329670 | A1 | 12/2010 | Essiambre et al. |
| 2010/0329671 | A1* | 12/2010 | Essiambre et al. ............. 398/44 |
| 2010/0329693 | A1* | 12/2010 | Chen ............................ 398/147 |
| 2011/0038631 | A1 | 2/2011 | Doerr |
| 2011/0243490 | A1 | 10/2011 | Ryf |

FOREIGN PATENT DOCUMENTS

| | | | |
|---|---|---|---|
| EP | 0136742 | A2 | 4/1985 |
| EP | 1396742 | A2 | 3/2004 |
| JP | S5311040 | A | 2/1978 |
| JP | 06174965 | A | 6/1994 |
| JP | 09171114 | A | 6/1997 |
| JP | 2008530904 | A | 8/2008 |
| WO | WO2010107439 | A1 | 9/2010 |
| WO | WO2010151432 | A1 | 12/2010 |

OTHER PUBLICATIONS

International Search Report; Mailed Jun. 5, 2012 for corresponding PCT Application No. PCT/US2012/026734.
Lee S. C. J. et al., "10.7 Gbit/s Tranmission over 220 m Polymer Optical Fiber Using Meximum Likelihood Sequence Estimation," Optical Fiber Communication Conference and Exposition National Fiber Optic Engineers Conference. OFCNFOEC 2007, Mar. 25-29, 2007; pp. 1-3. XP031146584.
Ryf, Roland, "Waveguide Coupler for Optical Transverse-Mode Multiplexing," U.S. Appl. No. 12/827,284, filed Jun. 30, 2010.
Ryf, Roland, "Scalable Waveguide-Mode Coupler for an Optical Receiver or Transmitter," U.S. Appl. No. 12/986,468, filed Jan. 7, 2010.
Winzer, Peter J., "Reference-Signal Distribution in an Optical Transport System," U.S. Appl. No. 13/018,511, filed Feb. 1, 2010.
Gloge, D, "Weakly Guiding Fibers," Applied Optics, vol. 10, No. 10, Oct. 1971, pp. 2252-2258.
Essiambre, René-Jean, et al., "Capacity Limits of Optical Fiber Networks," Journal of Lightwave Technology, vol. 28, No. 4, Feb. 15, 2010, pp. 662-701.
Ryf, R., et al., "Coherent 1200-km 6 × 6 MIMO Mode-Multiplexed Transmission over 3-core Microstructured Fiber," European Conference on Optical Communication (ECOC) Postdeadline Papers, 2011 (3 pages).
Notice of Rejection; Mailed Oct. 14, 2014 for the corresponding JP Application No. JP2013-556763.
Notice of Rejection; Mailed Oct. 14, 2014 for the related JP Application No. JP2013-556796.
Notice of Preliminary Rejection; dated Jan. 28, 2015 for KR Application No. KR 10-2013-07026046.
European Examination Report; dated Mar. 18, 2015 for the corresponding EP Application No. EP 12708459.8.
Chinese Office Action; dated Feb. 16, 2017 for CN Application No. CN201280011634.6.
Kokubun, Yasuo, and Masanori Koshiba. "Novel Multi-Core Fibers for Mode Division Multiplexing: Proposal and Design Principle." IEIEC Electronics Express, vol. 6, No. 8, 2009, pp. 522-528.
Tkach, Robert W. "Scaling optical communications for the next decade and beyond." Bell Labs Technical Journal 14.4 (2010): 3-9.
Berdagué, S., and P. Facq. "Mode division multiplexing in optical fibers." Applied optics 21.11 (1982): 1950-1955.
Koebele, C., et al. "Nonlinear Effects in Long-Haul Transmission over Bimodal Optical Fibre." Optical Communication (ECOC), 2010 36th European Conference and Exhibition on, vol. 1-2, 2010, pp. 1-3.
Tarighat, Alireza, et al. "Fundamentals and Challenges of Optical Multiple-Input Multiple-Output Multimode Fiber Links." 2007, pp. 57-63.
Schöllmann, Stefan, et al. "Experimental Realisation of 3 × 3 MIMO System with Mode Group Diversity Multiplexing Limited by Modal Noise." Optics InfoBase Conference Papers, 2008, pp. Optics InfoBase Conference Papers, 2008.
Bülow, Henning, Hussein Al-Hashimi, and Bernhard Schmauss. "Stable coherent MIMO transport over few mode fiber enabled by an adiabatic mode splitter." Optical Communication (ECOC), 2010 36th European Conference and Exhibition on. IEEE, 2010.
Mezzadri, Francesco. "How to generate random matrices from the classical compact groups." arXiv preprint math-ph/0609050 (2006).
M. Nazarathy et al., "Coherent transmission direct detection MIMO over short-range optical interconnects and passive optical networks," J. Lightwave Technol., 26, 2037 (2008).
Wedding, B., and C.N. Haslach. "Enhanced PMD Mitigation by Polarization Scrambling and Forward Error Correction." Optical Fiber Communication Conference and Exhibit, 2001. OFC 2001, vol. 3, 2001, p. WAA1.
Foschini, Gerard J. "Layered Space-Time Architecture for Wireless Communication in a Fading Environment When Using Multi-Element Antennas." Bell Labs Technical Journal, vol. 1, No. 2, 1996, pp. 41-59.
Stuart, Howard R., "Dispersive Multiplexing in Multimode Optical Fiber." Science (New York, N.Y.), vol. 289, No. 5477, 2000, pp. 281-283.

* cited by examiner

500

520

600

700

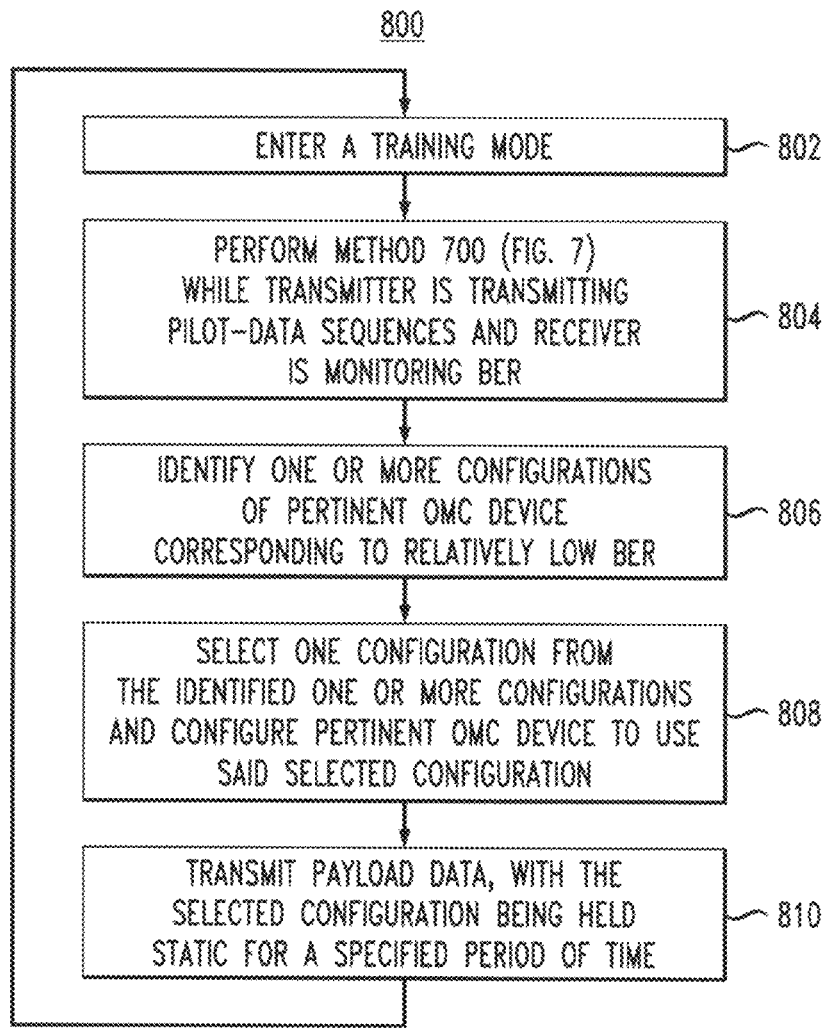
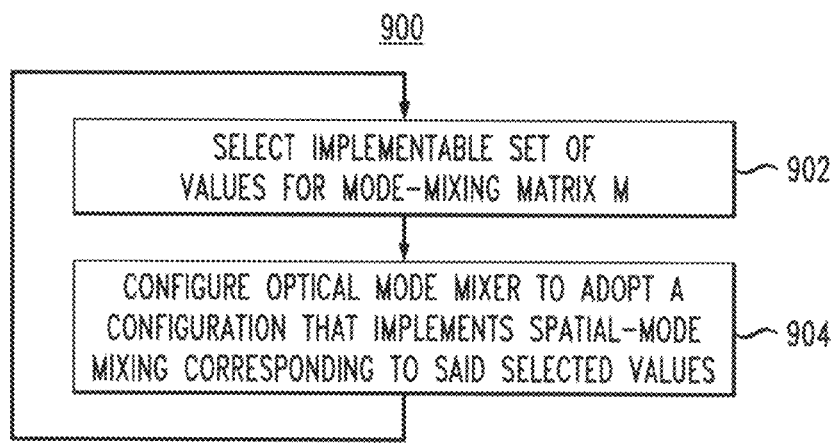

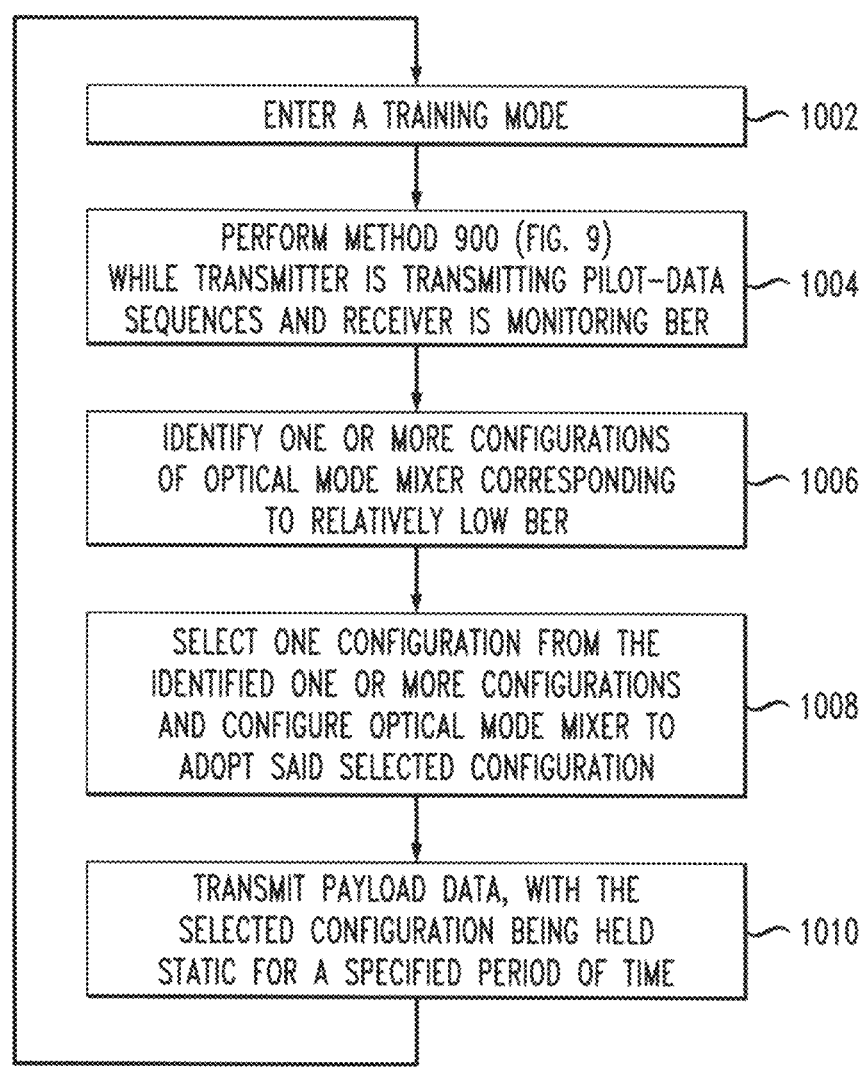

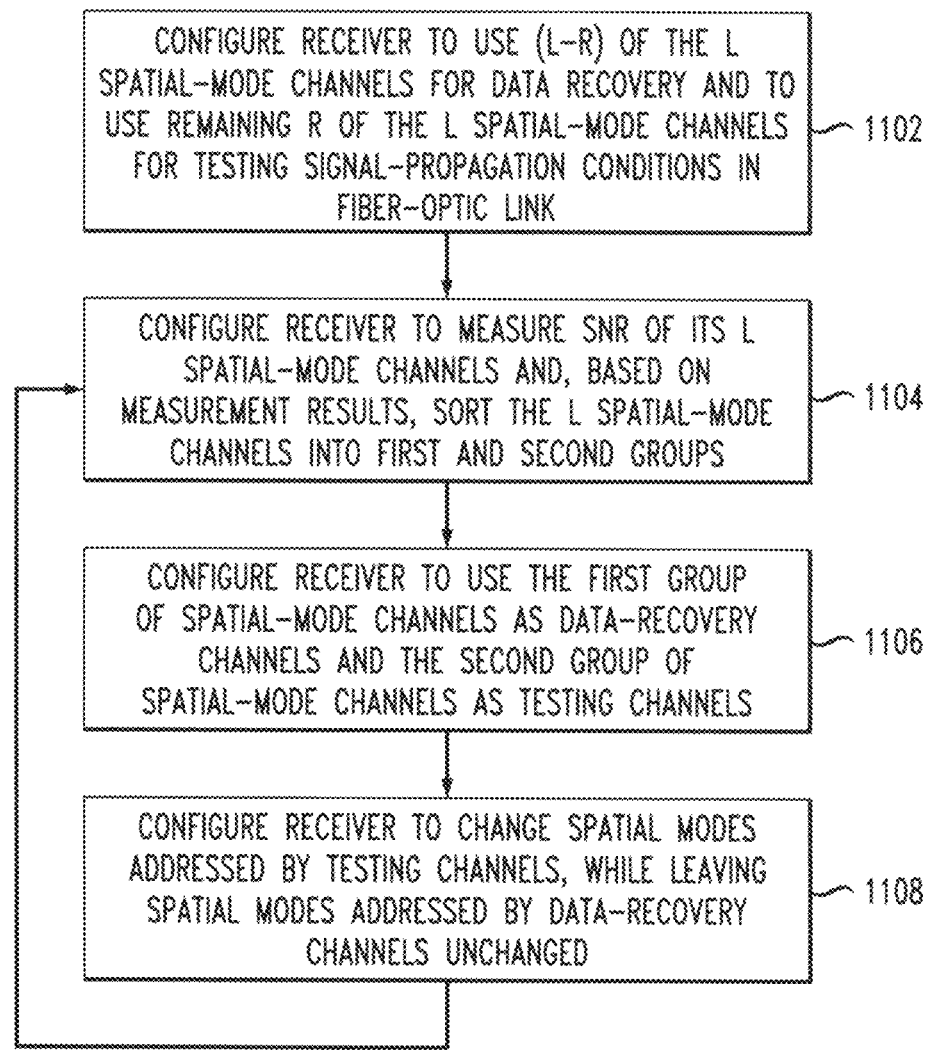

DYNAMIC SPATIAL-MODE ALLOCATION IN AN UNDER-ADDRESSED OPTICAL MIMO SYSTEM

CROSS-REFERENCE TO RELATED APPLICATIONS

This application claims priority from U.S. Provisional Patent Application No. 61/449,246, filed Mar. 4, 2011, and entitled "SPATIAL-MODE MANAGEMENT IN UNDER-ADDRESSED OPTICAL MIMO SYSTEMS," which is incorporated herein by reference in its entirety.

The subject matter of this application is related to that of U.S. Pat. No. 8,705,913, which is incorporated herein by reference in its entirety.

BACKGROUND

Field of the Invention

The present invention relates to optical communication equipment and, more specifically but not exclusively, to equipment for establishing and operating multiple-input/multiple-output (MIMO) optical-transport channels over a multimode or multi-core fiber.

Description of the Related Art

This section introduces aspects that may help facilitate a better understanding of the invention(s). Accordingly, the statements of this section are to be read in this light and are not to be understood as admissions about what is in the prior art or what is not in the prior art.

MIMO methods are being actively developed to exploit the inherently high transmission capacity of multimode and multi-core optical fibers. At a transmitter of an optical MIMO system, a plurality of optical signals are independently modulated with data and coupled into a corresponding plurality of spatial modes of a multimode or multi-core fiber for transmission to a remote receiver. At the receiver, the received optical signals carried by the plurality of spatial modes are separated from one another and demodulated/decoded to recover the data encoded onto the original optical signals at the receiver.

A representative multimode or multi-core fiber used in an optical MIMO system may have a relatively large number of (e.g., >100) spatial modes. Due to certain hardware limitations, a conventional transmitter may not be able to individually address all of the spatial modes supported by a typical multimode or multi-core fiber. For similar hardware reasons, a conventional receiver also may not be able to individually address all of those supported spatial modes. As a result, such a transmitter may not be able to simultaneously couple corresponding modulated optical signals into all of the supported spatial modes, and such a receiver may not be able to simultaneously extract corresponding modulated optical signals from all of the supported spatial modes. In addition, the subset of spatial modes addressed at the transmitter may differ from the subset of spatial modes addressed at the receiver. Disadvantageously, the optical noise and mode-dependent loss imposed by the fiber-optic link may cause the outage probability in such an under-addressed optical MIMO system to be relatively high.

SUMMARY

These and certain other problems in the prior art are addressed by various embodiments of an optical MIMO system disclosed herein. Innovative aspects of this disclosure include, but are not limited to: (i) an optical MIMO system designed and configured to dynamically and intelligently manage the spatial-mode selection/allocation at a transmitter and/or receiver of optical space-division-multiplexed (SDM) signals, (ii) an intra-link optical mode mixer designed and configured to controllably alter the spatial-mode mixing characteristics of the optical link, and (iii) methods of operating the system as a whole and, also, each of the transmitter, receiver, and mode mixer individually to achieve a high transmission capacity and/or high reliability of operation. Certain benefits and advantages provided by various embodiments of the disclosure may become especially pronounced when the system specifications impose a relatively stringent bit-error rate (BER) requirement.

According to one aspect of the disclosure, the outage probability in an under-addressed optical MIMO system may be reduced by configuring a spatial-mode coupler at a transmitter or a spatial-mode separator at a receiver to dynamically change its spatial-mode configuration on a time scale that is faster than the channel coherence time. Provided that the MIMO system employs an FEC (forward error correction) code that has a sufficient error-correcting capacity for correcting the amount of errors corresponding to an average state of the MIMO channel established between the transmitter and receiver, this relatively fast dynamic change tends to reduce the frequency of events during which the number of errors per FEC-encoded block of data exceeds the error-correcting capacity of the FEC code.

According to one embodiment, provided is an optical system having an optical-mode-coupling (OMC) device configured to address a first subset of spatial modes of an optical link; and a controller configured to reconfigure the OMC device to address a second subset of spatial modes of the optical link during transmission of an optical signal carrying data through said OMC device and said optical link, wherein the second subset differs from the first subset by one or more spatial modes.

In some embodiments of the above optical system, the optical link comprises a multimode fiber, a multi-core fiber, or a fiber-optic cable; and the OMC device is configured to address a subset of spatial modes of said multimode fiber, multi-core fiber, or fiber-optic cable.

In some embodiments of any of the above optical systems, the data comprises an FEC-encoded block of data or a pilot data sequence.

In some embodiments of any of the above optical systems, the controller is configured to cause the OMC device to change the addressing of the spatial modes at a rate that is greater than an inverse of a channel coherence time corresponding to the optical link.

In some embodiments of any of the above optical systems, the OMC device is a spatial-mode coupler of an optical transmitter.

In some embodiments of any of the above optical systems, the optical system further comprises: an FEC encoder configured to generate a plurality of data streams carrying an FEC-encoded block of data; and an E/O converter configured to convert said plurality of data streams into a plurality of modulated optical signals, wherein: the controller is configured to cause the spatial-mode coupler to change one or more spatial modes in the first subset during transmission through said spatial-mode coupler of said plurality of modulated optical signals; and the spatial-mode coupler is configured to couple each of the modulated optical signals of said plurality into a corresponding spatial mode of the optical link belonging to a currently addressed subset.

In some embodiments of any of the above optical systems, the FEC encoder is configured to employ an FEC code having an FEC block size that causes duration of said transmission of the modulated optical signals carrying the FEC-encoded block of data to be shorter than a channel coherence time.

In some embodiments of any of the above optical systems, the data comprises a pilot data sequence; the optical system is configured to monitor a performance metric during the transmission through said OMC device and the optical link of the optical signal carrying the pilot data sequence data; and the controller is further configured to select the second subset of the spatial modes based on the monitored performance metric and configure the OMC device to address the second subset of the spatial modes during transmission through said OMC device and said optical link of a second optical signal carrying payload data.

In some embodiments of any of the above optical systems, the controller is further configured to cause the OMC device to keep the second subset unchanged until a transmission through said OMC device and said optical link of a third optical signal carrying a pilot data sequence.

In some embodiments of any of the above optical systems, the OMC device is a spatial-mode separator of an optical receiver.

In some embodiments of any of the above optical systems, the spatial-mode separator is configured to convert an optical SDM signal received from said optical link into a plurality of modulated optical signals, each of said modulated optical signals corresponding to a respective spatial mode from a currently addressed subset; and the optical system further comprises: an O/E converter configured to convert the plurality of modulated optical signals into a corresponding plurality of streams of digital samples; and a digital signal processor configured to process the plurality of streams of digital samples to recover data carried by the optical SDM signal.

In some embodiments of any of the above optical systems, at sorting times, the optical receiver is configured to sort the spatial modes of the currently addressed subset into a first group and a second group based on SNR values of the corresponding modulated optical signals so that the first group has higher SNR values than the second group; the digital signal processor is configured to recover the data carried by the optical SDM signal based on the streams of digital samples corresponding to the first group of spatial modes; and, between two consecutive sorting times, the controller is configured to cause the spatial-mode separator to change one or more spatial modes in the second group of spatial modes while keeping the first group of spatial modes unchanged.

In some embodiments of any of the above optical systems, the controller is configured to: select a first spatial mode in the second group corresponding to a lowest SNR value; randomly select a second spatial mode outside of the currently addressed subset of spatial modes; and cause the spatial-mode separator to address the second spatial mode instead of the first spatial mode.

In some embodiments of any of the above optical systems, the controller is configured to: randomly select a first spatial mode from a currently addressed subset; randomly select a second spatial mode outside of the currently addressed subset; and cause the OMC device to address the second spatial mode instead of the first spatial mode.

According to another embodiment, provided is an optical system having an OMC device configured to address a first subset of spatial modes of an optical link for carrying data and a second subset of spatial modes of the optical link for monitoring a performance metric, wherein the first subset and the second subset taken together include all guiding modes of the optical link. The optical system also has a controller configured to reconfigure the optical system to change at least one of the first and second subsets during transmission of an optical signal carrying data through said OMC device and said optical link.

According to yet another embodiment, provided is a method of processing optical signals. The method comprises the steps of configuring an OMC device to address a first subset of spatial modes of an optical link; and changing one or more spatial modes in the first subset while transmitting through the OMC device and said optical link an optical signal carrying data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other aspects, features, and benefits of various embodiments of the invention will become more fully apparent, by way of example, from the following detailed description and the accompanying drawings, in which:

FIG. 8 shows a flowchart of a method of operating the system of FIG. 1 according to another embodiment of the disclosure;

FIG. 9 shows a flowchart of a method of operating the system of FIG. 1 according to yet another embodiment of the disclosure;

FIG. 10 shows a flowchart of a method of operating the system of FIG. 1 according to yet another embodiment of the disclosure; and FIG. 11 shows a flowchart of a method of operating the system of FIG. 1 according to yet another embodiment of the disclosure.

DETAILED DESCRIPTION

Figure 1:
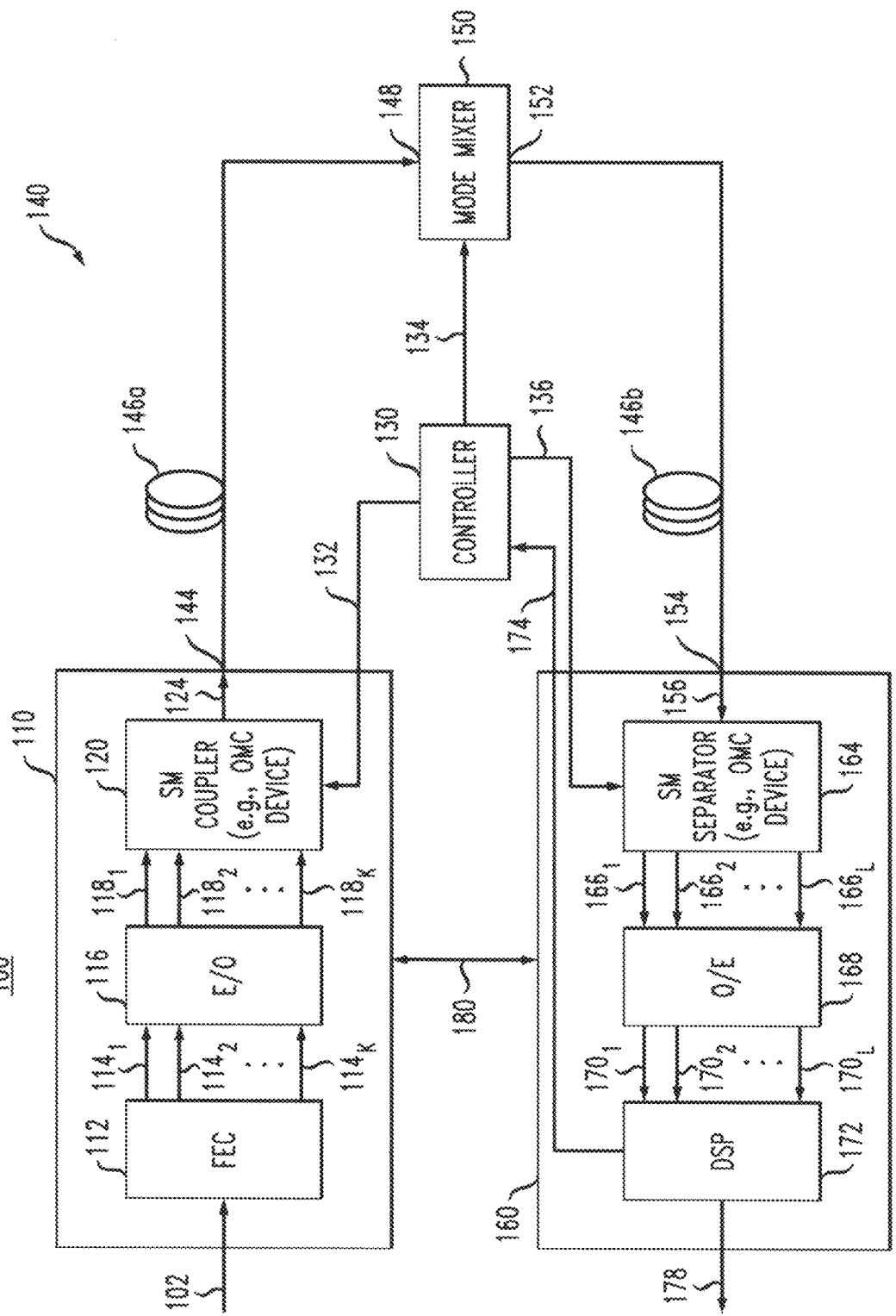
FIG. 1 shows a block diagram of an optical MIMO system according to one embodiment of the disclosure.

A multimode fiber can provide a higher transmission capacity than a single-mode fiber, e.g., by means of space-division multiplexing (SDM). More specifically, different guided modes of a multimode fiber can be populated with different modulated optical signals or different linear combinations of a given set of independently modulated optical signals. The original data can then be recovered at the receiver by appropriately de-multiplexing and de-convolving the resulting received optical SDM signal. A similar concept is also applicable to a multi-core fiber. Advantageously, space-division multiplexing can be used to complement other multiplexing techniques, such as time-division multiplexing, wavelength-division multiplexing, orthogonal frequency-division multiplexing, and polarization-division multiplexing, thereby further increasing the accessible transmission capacity of the corresponding optical-transport link.

As known in the art, a multimode fiber may subject the optical signals transmitted therethrough to stochastic amplitude fading. The deleterious effects of amplitude fading may be mitigated, at least to some extent, by the use of FEC (forward error correction) coding. An FEC code uses systematically generated redundant data to reduce the bit-error rate (BER) at the receiver. The cost of this reduction is a concomitant increase in the required forward-channel bandwidth, the latter being characterized by the "rate" of the FEC code. In general, a lower-rate FEC code is used for a noisier channel. When the channel conditions fluctuate over time, the rate and/or the FEC code can be adaptively changed to maintain an acceptable BER. However, whenever the channel fluctuations are too fast and/or changing the code rate dynamically is too complex for a given system, one uses a fixed code rate and a fixed FEC code, which tends to work reliably on most optical-channel instantiations. However, for those optical-channel instantiations whose maximum MIMO capacities are lower than the minimum MIMO capacity permitted by the FEC code, the received SDM signal may become un-decodable, which may disadvantageously produce errors for the amount of time the optical channel remains in such a "bad" instantiation, resulting in a system outage.

As used herein, the term "outage" refers to an event during which the receiver loses its ability to recover data from the received optical signals with a BER that is smaller than a specified threshold BER. In general, at any given time, signal-propagation conditions in a fiber-optic link are not uniform for different spatial modes and, in addition, those conditions can vary over time for each different spatial mode. In an under-addressed optical MIMO system, an outage may occur, for example, when the signal-propagation conditions are particularly unfavorable for the subset(s) of spatial modes addressed by the transmitter and/or receiver.

Various embodiments of the disclosure are directed at alleviating at least some of the above-indicated limitations of FEC coding, as applied to under-addressed optical MIMO systems. For example, one or more of the disclosed performance-enhancement techniques may be capable of reducing the outage probability by changing, from time to time, one or more of (i) the subset of spatial modes addressed by the transmitter, (ii) the subset of spatial modes addressed by the receiver, and (iii) spatial-mode mixing characteristics of the fiber-optic link. The changes may be performed in a controllable manner that tends to cause the actual BER to be lower than the BER observed in a corresponding static configuration. Advantageously, the lower BER usually manifests itself either as a lower outage probability for a fixed MIMO data-transmission capacity or as a higher achievable MIMO data-transmission capacity for a specified fixed outage probability.

A communications provider may also advantageously use some embodiments from this disclosure to deploy an optical fiber or fiber-optic cable that is capable of accommodating "future" optical-signal transport techniques. For example, currently, the optical-transponder technology may not have reached the point yet that enables all spatial modes to be addressed. This constraint may in part be due to technical limitations in the coupling optics and/or limitations in the capabilities of the MIMO-processing ASICs. However, certain embodiments disclosed herein may enable such a communications provider to deploy a "future-proof" optical fiber or fiber-optic cable while giving said communications provider a means for minimizing the outage probability when the corresponding communication system remains being operated with the optical fiber or fiber-optic cable being in an "under-addressed" configuration.

FIG. 1 shows a block diagram of an optical MIMO system 100 according to one embodiment of the disclosure. System 100 has an optical transmitter 110 and an optical receiver 160 coupled to one another via a fiber-optic link 140. Fiber-optic link 140 has two fiber-optic sections 146a-b and an optical mode mixer 150 placed between those two sections. System 100 further has a controller 130 that is operatively connected to one or more of transmitter 110, receiver 160, and mode mixer 150, e.g., as indicated in FIG. 1.

In operation, controller 130 controls, as further described below, the configurations of one or more of (i) a spatial-mode (SM) coupler 120 in transmitter 110, (ii) an SM separator 164 in receiver 160, and (iii) optical mode mixer 150. In various embodiments, controller 130 may comprise one or more separate modules. Some of these separate modules (if any) may be co-located with transmitter 110. Some other modules (if any) may be co-located with receiver 160. Yet some other modules (if any) may be placed at one or more dedicated locations along fiber-optic link 140, e.g., near optical mode mixer 150.

The following alternative embodiments of system 100 are also envisioned. In certain alternative embodiments, at least one of SM coupler 120 and SM separator 164 is a dynamically (re)configurable optical mode-coupling (OMC) device, while mode mixer 150 is either a static optical mode mixer or not present at all. In other alternative embodiments, mode mixer 150 is a dynamically (re)configurable device, while one or both of SM coupler 120 and SM separator 164 are static OMC devices. Furthermore, fiber-optic link 140 may have more than two fiber-optic sections 146 with a corresponding instance of optical mode mixer 150 coupled between the respective adjacent fiber-optic sections 146. For example, if link 140 has three fiber-optic sections 146, then the link has two optical mode mixers 150. One of these two optical mode mixers is coupled between the first and second fiber-optic sections of the link, and the other of these two optical mode mixers is coupled between the second and third fiber-optic sections of the link.

In operation, transmitter 110 receives an input data stream 102 and generates an optical SDM output signal 124 that carries the data supplied by the input data stream. Input data stream 102 is applied to an FEC encoder 112 that adds redundancy to the data, e.g., using a suitable FEC code. Each block of redundant data produced by the FEC code is optionally interleaved and/or de-multiplexed to produce K parallel data streams $114_1$-$114_K$, where K is an integer greater than one. FEC encoder 112 then applies data streams $114_1$-$114_K$ to an electrical-to-optical (E/O) converter 116.

E/O converter 116 has K optical modulators (not explicitly shown in FIG. 1), each configured to generate a corresponding one of modulated optical signals $118_1$-$118_K$. In one embodiment, modulated optical signals $118_1$-$118_K$ have the same (common) carrier frequency, and each of these optical signals carries the data supplied by the corresponding one of data streams $114_1$-$114_K$. For example, modulated optical signal 118₁ carries the data supplied by data stream 114₁; modulated optical signal 118₂ carries the data supplied by data stream 114₂, etc.

In one embodiment, SM coupler 120 receives optical signals 118₁-118$_K$ from E/O converter 116 via K respective single-mode fibers and applies spatial phase filtering to each of these optical signals 118 to properly condition them for selective coupling into different respective spatial modes of fiber-optic section 146a. The spatially phase-filtered signals (not explicitly shown in FIG. 1) are overlapped in SM coupler 120, e.g., as further described below in reference to FIGS. 2-4, to generate optical SDM signal 124 at an input terminus 144 of fiber-optic section 146a.

The spatial phase filtering applied in SM coupler 120 to each of optical signals 118₁-118$_K$ is such that each of these optical signals couples substantially into a single selected spatial mode of fiber-optic section 146a, with different signals 118 being coupled into different respective spatial modes. Depending on the particular embodiment of system 100, the mapping of different optical signals 118 onto different spatial modes of fiber-optic section 146a may be static (i.e., fixed and unchanging over time) or dynamic (i.e., changing over time). When SM coupler 120 is a (re)configurable SM coupler, controller 130 controls, via a control signal 132, the spatial-mode configuration of the SM coupler and its changes over time.

When an individual optical signal is selectively coupled by SM coupler 120 substantially into a single spatial mode of fiber-optic section 146a at input terminus 144 and is thereby transformed into an optical component of SDM signal 124, which is launched down that fiber-optic section, it is said that that spatial mode is being "addressed" by transmitter 110.

In various embodiments, each of fiber-optic sections 146a-b can be implemented using, for example (without limitation), one or more of the following: (i) a multimode fiber; (ii) a multi-core fiber; (iii) a bundle of single-mode fibers; and (iv) a fiber-optic cable. If a multi-core fiber is used, then each core of that fiber may be designed to support a respective single spatial mode or a respective plurality of spatial modes. Additional details on possible implementations of fiber-optic sections 146a-b can be found, e.g., in U.S. Patent Application Publication Nos. 2010/0329670 and 2010/0329671 and in U.S. patent application Ser. No. 13/018,511, all of which are incorporated herein by reference in their entirety.

In certain embodiments, each of fiber-optic sections 146a-b supports N spatial modes, where N>K. In other words, in these embodiments, transmitter 110 addresses fewer spatial modes in fiber-optic link 140 than the maximum possible number of spatial modes therein. As a result, fiber-optic link 140 operates as an under-addressed SDM link. In an alternative embodiment, N=K. In other alternative embodiments, fiber-optic section 146a supports $N_a$ spatial modes, while fiber-optic section 146b supports $N_b$ spatial modes, where $N_a \neq N_b$ and each of $N_a$ and $N_b$ is greater than or equal to K.

It is known in the art that spatial modes of a multimode or multi-core fiber may undergo inter-mode mixing as they propagate along the length of the fiber. As a result, even if a communication signal is completely confined to a particular single spatial mode at the input terminus of the fiber, other spatial modes will have contributions from that communication signal at the output terminus of the fiber, e.g., an output terminus 148 of fiber-optic section 146a.

Optical mode mixer 150 provides a capability for controllably changing the spatial-mode mixing characteristics of fiber-optic link 140. Mathematically, the effect of optical mode mixer 150 on the SDM signal propagating therethrough is described by Eq. (1):

$$'s_{out} = M's_{in} \quad (1)$$

where $'s_{in}$ is an input-signal vector having $N_a$ components, with each component representing the optical signal that populates the corresponding spatial mode addressed by optical mode mixer 150 at output terminus 148 of fiber-optic section 146a; $'s_{out}$ is an output-signal vector having $N_b$ components, with each component representing the optical signal that populates the corresponding spatial mode addressed by optical mode mixer 150 at an input terminus 152 of fiber-optic section 146b; and M is an $N_b \times N_a$ matrix that describes spatial-mode mixing characteristics of the optical mode mixer. In general, each of $'s_{in}$, $'s_{on}$, and M is a complex-valued entity. In a static configuration, mode-mixing matrix M is time-independent and has constant matrix elements. In a dynamic configuration, mode-mixing matrix M depends on time and has at least one matrix element that varies over time. When optical mode mixer 150 is a (re)configurable mode mixer, controller 130 controls, via a control signal 134, the configuration of the optical mode mixer and its changes over time.

Receiver 160 receives an optical SDM signal 156 from an output terminus 154 of fiber-optic section 146b, processes this SDM signal, e.g., as further described below, to recover the original data of data stream 102, and outputs the recovered data via an output data stream 178. SDM signal 156 is applied to SM separator 164, which splits SDM signal 156 into L optical signal components 166₁-166$_L$, which are then applied to an optical-to-electrical (O/E) converter 168. Note that, in various embodiments, L may or may not equal K. In a representative embodiment, L may be smaller than $N_b$ and also smaller than $N_a$.

In one embodiment, SM separator 164 is an OMC device that is analogous to SM coupler 120, but configured to operate in the reverse direction. For example, SM separator 164 may be designed to couple optical signals 166₁-166$_L$ into L respective single-mode fibers for delivery to O/E converter 168. To perform said coupling, SM separator 164 splits SDM signal 156 into L (e.g., attenuated) copies and applies appropriate spatial phase-filtering to properly condition each of said copies for coupling into the corresponding one of the single-mode fibers. The spatial phase-filtering applied in SM separator 164 to the copies of SDM signal 156 is such that each of the single-mode fibers receives optical energy substantially from a single selected spatial mode of fiber-optic section 146b, with different single-mode fibers receiving optical energy from different respective spatial modes. Depending on the particular embodiment of system 100, the mapping of different optical signals 166 onto different spatial modes of fiber-optic section 146b may be static (i.e., fixed and unchanging over time) or dynamic (i.e., changing over time). When SM separator 164 is a (re)configurable SM separator, controller 130 controls, via a control signal 136, the configuration of the SM separator and its changes over time.

When a single-mode fiber coupled to SM separator 164 receives optical energy substantially from a corresponding single selected spatial mode of fiber-optic section 146b at output terminus 154 and thereby generates a corresponding one of signals 166₁-166$_L$, it is said that that spatial mode is being "addressed" by receiver 160.

The relationship between optical signals 118 and optical signals 166 can generally be expressed using Eq. (2):

$$'S_{out} = H'S_{in} \quad (2)$$

where 'S$_{in}$ is a vector having K components, wherein each component is a corresponding one of optical signals 118$_1$-118$_K$; 'S$_{out}$ is a vector having L components, wherein each component is a corresponding one of optical signals 166$_1$-166$_L$; and H is the L×K channel matrix. Note that channel matrix H depends, among other things, on the configuration of SM coupler 120, the configuration of SM separator 164, and the configuration of optical mode mixer 150 (also see Eq. (1)). Different sets of values representing channel matrix H are referred to as different instantiations of that matrix.

In one embodiment, O/E converter 168 performs coherent (homodyne or intradyne) detection of each of optical signals 166$_1$-166$_L$ to generate a corresponding one of digital electrical signals 170$_1$-170$_L$. In each time slot, each of signals 170$_1$-170$_L$ may carry two values: one corresponding to the in-phase (I) component of the corresponding one of optical signals 166$_1$-166$_L$ and the other corresponding to the quadrature-phase (Q) component of that optical signal. Various optical detectors that can be used to implement O/E converter 168 are disclosed, e.g., in U.S. Patent Application Publication Nos. 2010/0158521 and 2011/0038631, and International Patent Application No. PCT/US09/37746 (filed on Mar. 20, 2009), all of which are incorporated herein by reference in their entirety.

A digital signal processor (DSP) 172 processes digital electrical signals 170$_1$-170$_L$ and, based on said processing, generates output data stream 178. The processing includes, but is not limited to, (i) de-convolving signals 170$_1$-170$_L$ to generate a set of recovered data streams (not explicitly shown in FIG. 1), wherein each recovered data stream carries data corresponding to one of data streams 114$_1$-114$_K$; (ii) de-interleaving blocks of data carried by the recovered data streams if FEC encoder 112 in transmitter 100 is configured to interleave the FEC-encoded data in the process of generating data streams 114$_1$-114$_K$; (iii) multiplexing the de-interleaved data or, if no de-interleaving needs to be performed, directly the blocks of data carried by the recovered data streams to generate an estimated data stream (not explicitly shown in FIG. 1); and (iv) FEC-decoding the estimated data stream to generate output data stream 178. Provided that the FEC code is sufficiently robust for the particular transmission characteristics/conditions of link 140, most (if not all) of the transmission/decoding errors are corrected, and output data stream 178 approximates (if not matches) input data stream 102 with a BER that is smaller than the maximum acceptable BER value specified for system 100.

In general, to properly perform the de-convolving step of the above-described signal processing, DSP 172 needs to receive, via signals 170$_1$-170$_L$, a sufficient number of signal samples. For example, to decode Q optical symbols carried by SDM signal 156, DSP 172 needs to obtain at least Q independent samples of that signal. The signal processing applied to these samples is generally based on matrix-diagonalization algorithms aimed at reversing the effects of spatial-mode mixing in fiber-optic link 140, including the effects of spatial-mode mixing imposed by optical mode mixer 150 (also see Eq. (1)).

For illustration purposes, the representative embodiments described below correspond to an embodiment of system 100 in which each of fiber-optic sections 146a and 146b is a multimode fiber. From the provided description, one of ordinary skill in the art will be able to modify the described embodiments to adapt them for an embodiment of system 100 in which, for example, (i) each of fiber-optic sections 146a and 146b is a multi-core fiber or (ii) one of fiber-optic sections 146a and 146b is a multi-core fiber while the other fiber-optic section is a multimode fiber.

In general, a multimode fiber has two broad classes of spatial modes: radiation modes and guided modes. Radiation modes carry energy out of the fiber core, which is then quickly dissipated. Radiation modes are not of interest for this disclosure and, as such, are not discussed here. Guided modes are primarily confined to the fiber core, and propagate energy along the fiber, thereby transporting information and power along fiber-optic link 140. Each guided mode has its own distinct velocity and can be further decomposed into two orthogonally polarized components. Any electro-magnetic (EM) field distribution within the optical fiber can generally be expressed as a combination of guided modes.

For a given wavelength λ, a multimode fiber of fiber section 146, can support multiple guided modes if the normalized frequency parameter V (also referred to as the V number) is greater than 2.405. Eq. (3) gives the expression for V:

$$V = \frac{2\pi a}{\lambda} NA \quad (3)$$

where α is the fiber-core radius, and NA is the numerical aperture. For a step-index fiber, the numerical aperture is given by Eq. (4):

$$NA = \sqrt{n_1^2 - n_2^2} \quad (4)$$

where n$_1$ is the refractive index of the fiber core, and n$_2$ is the refractive index of the fiber cladding.

The guided modes can generally be classified as (i) transverse electric (TE) modes, for which the axial component of the electric field is zero; (ii) transverse magnetic (TM) modes, for which the axial component of the magnetic field is zero; and (iii) HE or EH modes, for which neither the axial component of the electric field nor the axial component of the magnetic field is zero. The designation of HE or EH depends on which of the electric (E) and magnetic (H) field components is dominant.

The guided modes of a multimode fiber can be ordered based on one or more of the following: (i) the number of intensity lobes in the transverse plane, (ii) group velocity, and (iii) the magnitude of the longitudinal wavevector. The lowest-order (a.k.a. fundamental) mode typically has a single intensity lobe, the highest group velocity, and the largest longitudinal wavevector. The remaining (higher-order) modes are typically ordered based on the magnitude of their longitudinal wavevectors. For some waveguide cross-sections and V numbers, in addition to the use of the magnitude of longitudinal wavevectors, one of the remaining two criteria may need to be invoked to determine the relative order of some guided modes.

The refractive-index profiles of most step-index optical fibers used in communication links, such as fiber-optic link 140, have a relatively small (e.g., smaller than about 0.05) contrast Δ, which makes these fibers only weakly guiding. Eq. (5) gives the definition of Δ for a step-index fiber:

$$\Delta = \frac{n_1 - n_2}{n_1} \quad (5)$$

In the approximation of weak guidance for generally cylindrical fibers, the TE, TM, HE, and EH guided modes become the modes that are referred to as the linearly polarized (LP) modes.

The following notation is usually adhered to in the description of the LP modes. Each LP mode is designated using two integer indices, e.g., in the form of subscripts: $LP_{jk}$. The first integer index (j) gives the number of $2\pi$-sized phase increments in the electric field per one azimuthal rotation about the fiber axis (e.g., the Z-coordinate axis). The second integer index (k) gives the number of electric-field nodes in the radial dimension, with the zero field at the outer edge of the field distribution counted as a radial node. Some of the LP modes are also given a designating letter, e.g., a, b. The letter follows the two integer indices and is used to distinguish certain degenerate modes. In addition, each LP mode can have two different polarizations, e.g., an X polarization and a Y polarization, where X and Y are the two transverse (i.e., orthogonal to the fiber axis) coordinate axes.

Figure 2:
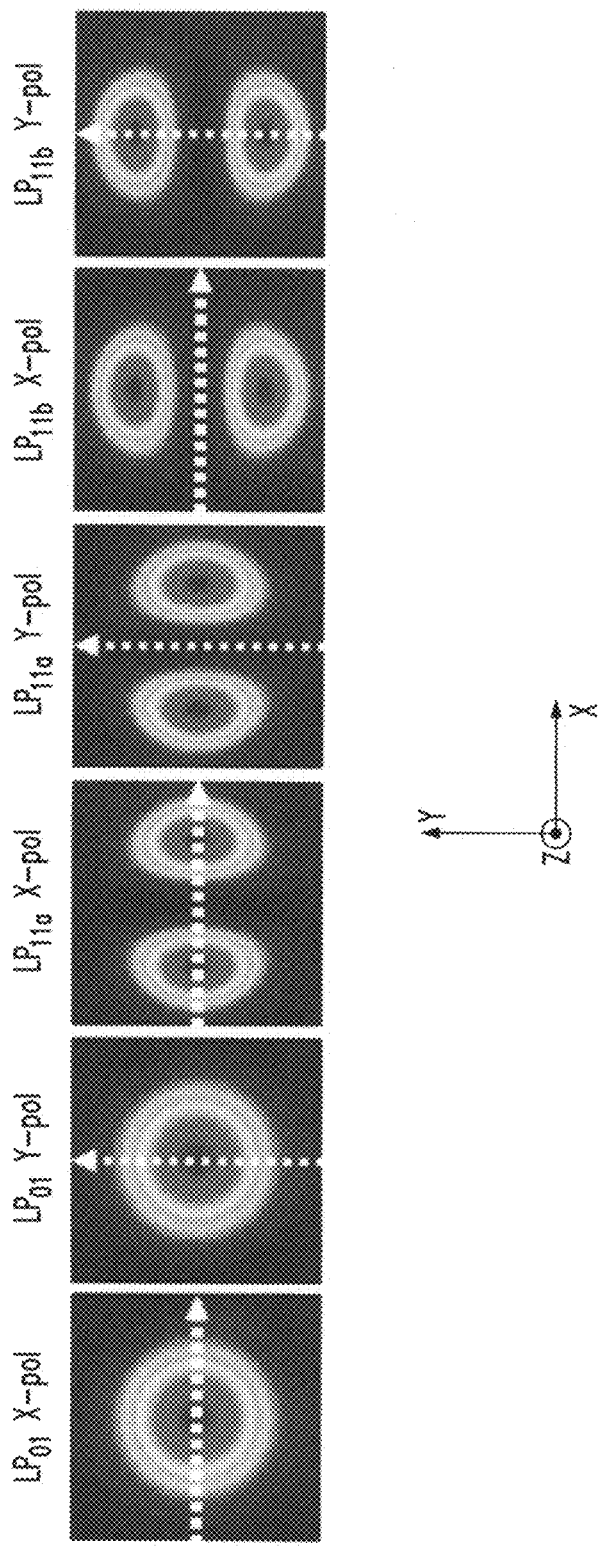
FIG. 2 shows representative intensity distributions and polarizations for the three lowest linearly polarized (LP) modes of a multimode fiber that can be used in the system of FIG. 1 according to one embodiment of the disclosure.

FIG. 2 graphically shows representative intensity distributions and polarizations for the three lowest LP modes of a multimode fiber that can be used in link 104 according to one embodiment of the disclosure. The intensity distributions are color-coded so that (i) the dark blue (outer) color corresponds to the zero intensity, (ii) the dark red (inner) color corresponds to the highest intensity, and (iii) the colors in between correspond to the intermediate intensities in the rainbow-like progression from blue to red. The dotted arrows indicate the respective electric-field polarizations for different modes. Each of the shown LP modes is doubly degenerate, with the same intensity distribution corresponding to each of two orthogonal (e.g., X and Y) polarizations.

The fundamental mode ($LP_{01}$) has an intensity profile that is similar to that of a Gaussian beam. The $LP_{01}$ mode corresponds to the $HE_{11}$ mode of a strongly guiding fiber.

The next lowest-order mode ($LP_{11}$) has an intensity profile comprising two intensity peaks characterized by a phase difference of 180 degrees between the corresponding electric fields. In the $LP_{11a}$ mode, the intensity peaks are lined up along the X-axis. In the $LP_{11b}$ mode, the intensity peaks are similarly lined up along the Y-axis. The different degenerate states of the $LP_{11a}$ and $LP_{11b}$ modes correspond to different linear combinations of the $TE_{01}$, $TM_{01}$, and $HE_{21}$ modes of a strongly guiding fiber. If the V number (see Eq. (3)) is in the range between about 2.405 and about 3.9, then the $LP_{01}$, $LP_{11a}$, and $LP_{11b}$ modes are typically the only guided modes supported by the fiber.

Figure 3:
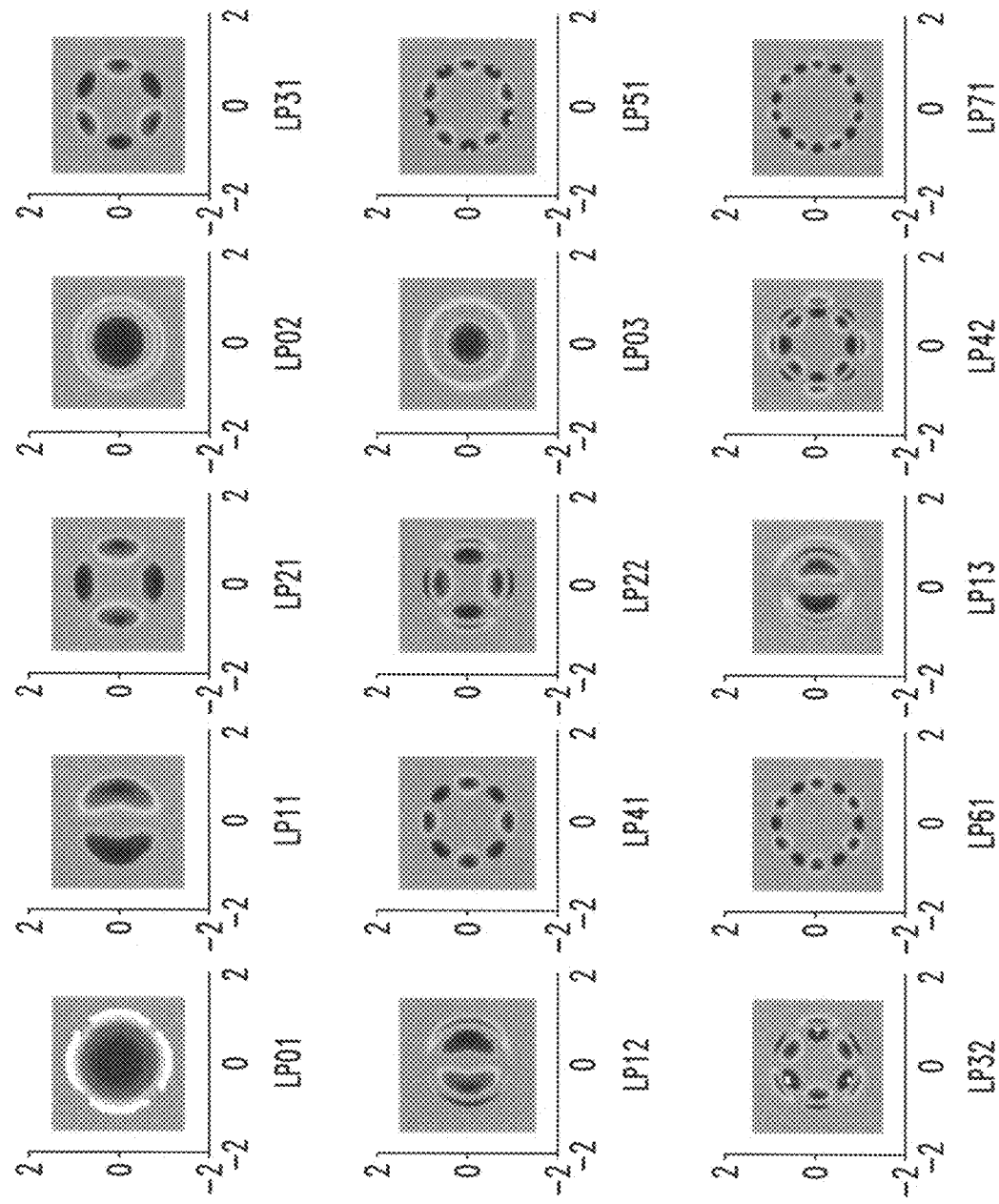
FIG. 3 shows representative phase/field-strength (PFS) patterns for several LP modes of a multimode fiber that can be used in the system of FIG. 1 according to another embodiment of the disclosure.

FIG. 3 graphically shows representative phase/field-strength (PFS) patterns for several LP modes of a multimode fiber that can be used in fiber-optic link 140 according to another embodiment of the disclosure. Each PFS pattern is color-coded using a color scheme in which: (i) the degree of color saturation represents the optical-field strength and (ii) the color itself represents the phase of the electric field. For example, the light red color corresponds to lower optical-field strength than the dark red color. A rainbow-like change in color from blue to red represents a continuous change in the relative phase from $-\pi$ to $+\pi$.

PFS patterns for different states of degenerate LP modes can be obtained by appropriately rotating the PFS patterns shown in FIG. 3. For example, the PFS pattern for the $LP_{11b}$ mode (see FIG. 2) can be obtained by rotating by 90 degrees the PFS pattern shown in the second-from-the-left panel in the top row of FIG. 3. The intensity distribution for the LP mode can be obtained by calculating a square of the absolute values of the corresponding PFS pattern. For example, the intensity distribution for the $LP_{01}$ mode shown in the left-most panel of FIG. 2 can be obtained by calculating a square of the absolute values of the PFS pattern shown in the left-most panel in the top row of FIG. 3. Similarly, the intensity distribution for the $LP_{11a}$ mode shown in the third-from-the-left panel of FIG. 2 can be obtained by calculating a square of the absolute values of the PFS pattern shown in the second-from-the-left panel in the top row of FIG. 3.

To efficiently and selectively couple light into a particular LP mode of a multimode fiber, the PFS pattern and polarization created by a light source at an end facet of the fiber should approximate closely the PFS pattern and polarization of that LP mode. In particular, the light that does not match the appropriate PFS pattern and polarization may be coupled into a different LP mode, be coupled into a radiation mode, and/or be reflected back from the end facet of the multimode fiber. For example, to efficiently and selectively couple light into the X-polarized $LP_{11a}$ mode, the corresponding light source should be configured to create a PFS pattern that closely approximates the PFS pattern shown in the second-from-the-left panel in the top row of FIG. 3 and the polarization shown in the third-from-the-left panel of FIG. 2.

For brevity and clarity reasons, the description below refers to low-order LP modes. However, embodiments of the disclosure disclosed herein are not so limited. For example, the illustrated inventive concepts are similarly applicable to a strongly guiding multimode fiber whose guided modes are the corresponding TE, TM, HE, and EH modes, rather than the LP modes illustrated in FIGS. 2 and 3. The illustrated inventive concepts are also applicable to the "supermodes" of a coupled multi-core fiber, a representative description of which can be found, e.g., in a post-deadline paper published in the proceedings of the 2011 European Conference on Optical Communication (ECOC) by R. Ryf, A. Sierra, R.-J. Essiambre, et al., entitled "Coherent 1200-km 6×6 MIMO Mode-Multiplexed Transmission over 3-core Microstructured Fiber," which is incorporated herein by reference in its entirety.

Figure 4A:
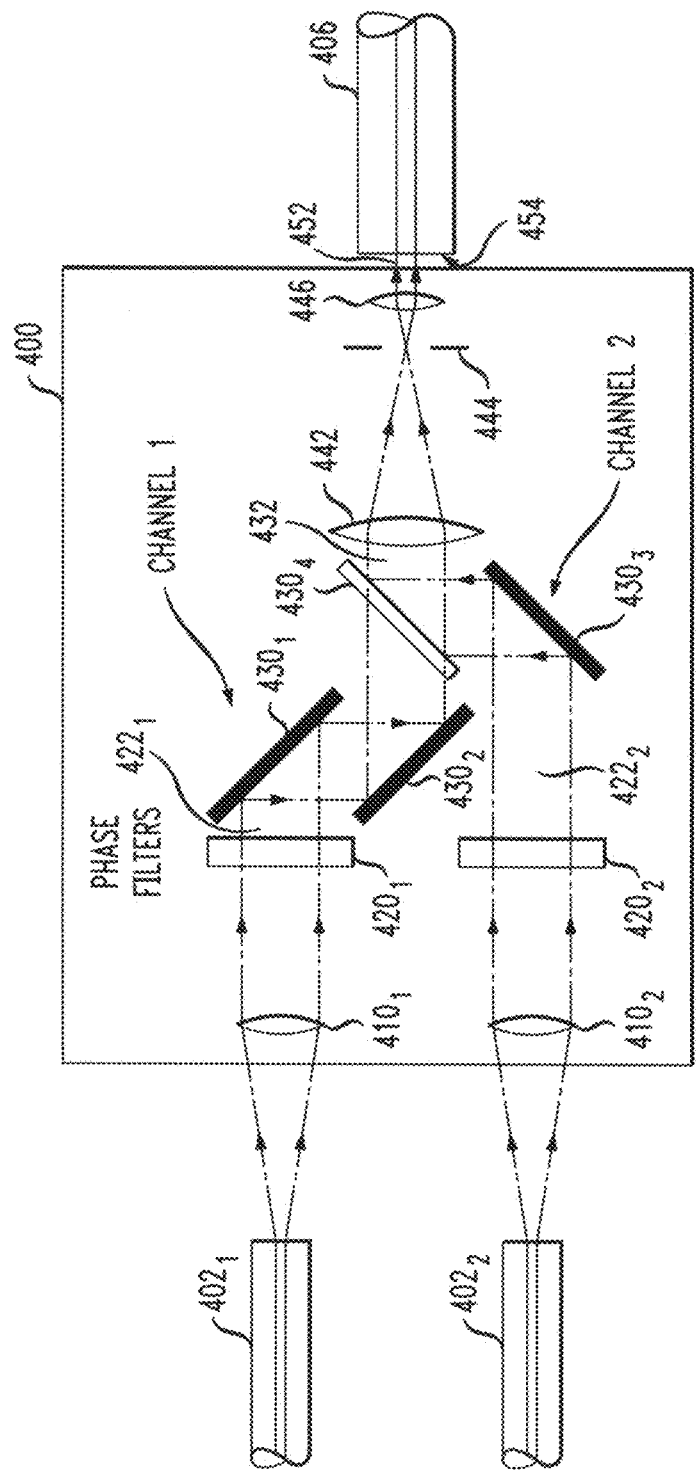
FIGS. 4A-4B illustrate an optical mode-coupling (OMC) device that can be used in the system of FIG. 1 according to one embodiment of the disclosure.
Figure 4B:
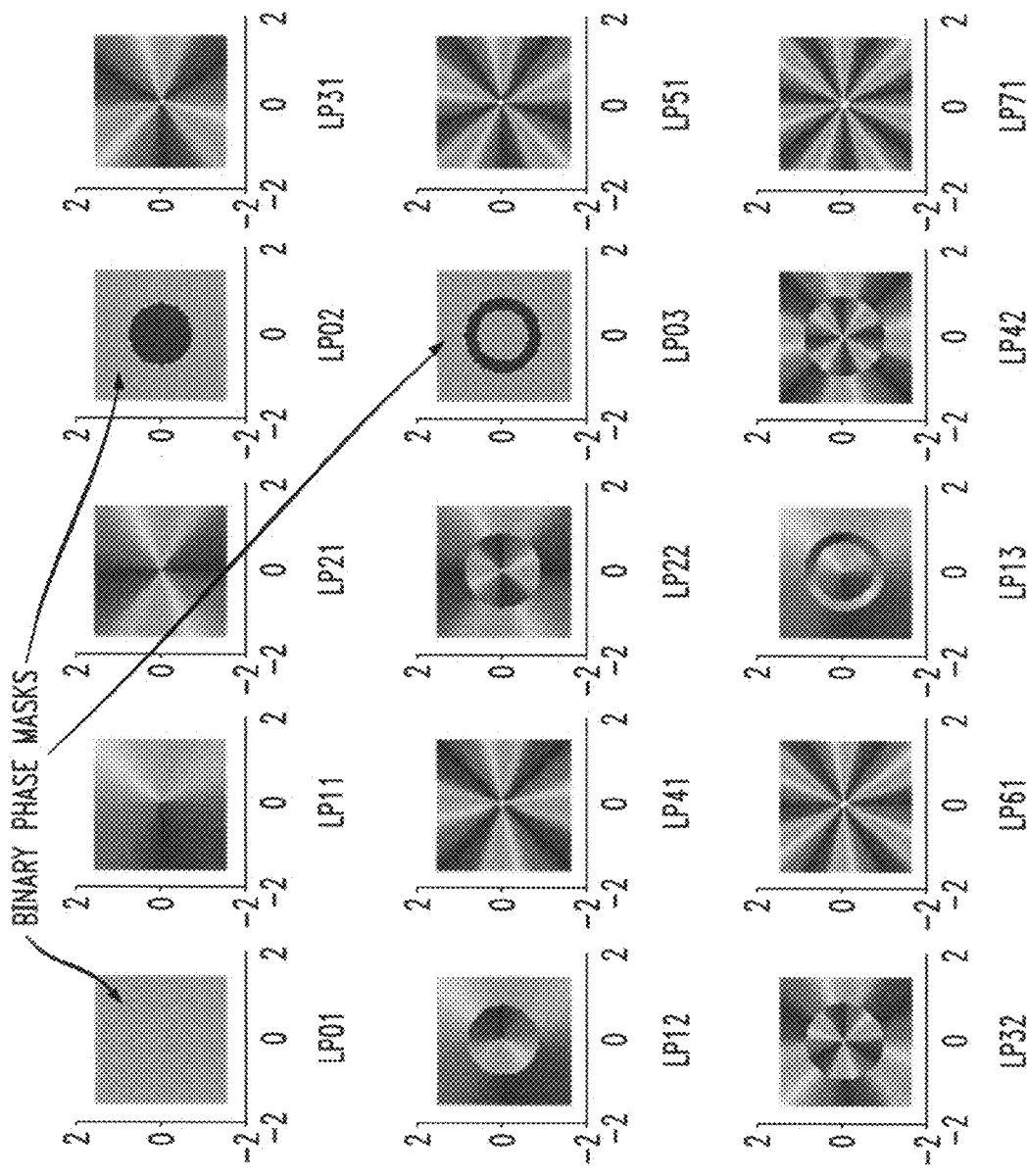

FIGS. 4A-4B illustrate an OMC device 400 that can be used as SM coupler 120 in transmitter 110 and/or SM separator 164 in receiver 160 according to one embodiment of the system 100 (also see FIG. 1). More specifically, FIG. 4A shows a block diagram of OMC device 400. FIG. 4B shows spatial-phase patterns that can be used in spatial-phase filters 420 of OMC device 400. For clarity of depiction, OMC device 400 is shown as having two spatial-mode channels. However, from the provided description, one of ordinary skill in the art will understand how to design an OMC device having any suitable number of channels for use in system 100. For example, a new optical channel can be created by adding a set of optical elements similar to that used to add Channel 2 to Channel 1 in OMC device 400.

In various embodiments, spatial-phase filters 420 can be static phase masks or dynamically (re)configurable devices capable of changing the displayed spatial-phase patterns under external control, e.g., effected by control signal 132 or 136 (see FIG. 1).

OMC device 400 is shown in FIG. 4A as being coupled to single-mode fibers $402_1$-$402_2$ at the left side thereof and to a multimode fiber 406 at the right side thereof. When OMC device 400 is used as SM coupler 120 in transmitter 110 (see FIG. 1), each of single-mode fibers $402_1$-$402_2$ is configured to receive a corresponding one of modulated optical signals 118, and multimode fiber 406 is a part of fiber section 146a. When OMC device 400 is used as SM separator 164 in receiver 160 (see FIG. 1), each of single-mode fibers $402_1$-$402_2$ is configured to carry a corresponding one of optical signal components 166, and multimode fiber 406 is a part of fiber section 146b.

For illustration purposes, the description of OMC device 400 provided below assumes that light is being directed from single-mode fibers $402_1$-$402_2$ to multimode fiber 406, e.g., as in the configuration corresponding to SM coupler 120 (FIG. 1). From this description, one of ordinary skill in the art will understand how OMC device 400 operates when light is being directed from multimode fiber 406 to single-mode fibers $402_1$-$402_2$, e.g., as in the configuration corresponding to SM separator 164 (FIG. 1).

OMC device 400 has two lenses 410, each of which collimates a respective diverging light beam applied to the OMC device by a respective one of fibers 402. Each of the resulting collimated beams passes through a respective one of spatial-phase filters 420 to create a corresponding phase-filtered beam 422. A plurality of mirrors 430 then spatially superimpose the two phase-filtered beams 422 and direct a resulting "superimposed" beam 432 toward fiber 406. Note that mirror $430_4$ is a partially transparent mirror, while each of mirrors $430_1$-$430_3$ is a regular, non-transparent mirror. Two lenses 442 and 446 and an aperture 444 are used to compress (e.g., reduce the size of) and spatially filter beam 432 to produce an output beam 452 that impinges on an input terminus 454 of multimode fiber 406 and creates an intended superposition of PFS patterns corresponding to the selected spatial modes of the multimode fiber (also see FIGS. 2-3).

Depending on the spatial modes assigned to the two spatial-mode channels of OMC device 400, the spatial-phase patterns displayed by spatial-phase filters $420_1$ and $420_2$ are appropriately chosen, e.g., from the set of spatial-phase patterns shown in FIG. 4B. For example, if a particular spatial-mode channel of OMC device 400 is assigned the $LP_{11a}$ mode of fiber 406, then the appropriately oriented spatial-phase pattern labeled LP11 in FIG. 4B is displayed by the corresponding spatial-phase filter 420 in that spatial-mode channel. Similarly, if a particular spatial-mode channel of OMC device 400 is assigned the $LP_{21b}$ mode of fiber 406, then the appropriately oriented spatial-phase pattern labeled LP21 in FIG. 4B is displayed by the corresponding spatial-phase filter 420 in that spatial-mode channel, and so on. The combined effect of the spatial-phase filtering imposed by the corresponding filter 420 and the spatial filtering imposed by aperture 444 is that the optical channel creates at input terminus 454 of fiber 406 an intended PFS pattern corresponding to the selected spatial mode, thereby efficiently coupling the optical signal received via the corresponding single-mode fiber 402 into that spatial mode of multimode fiber 406.

Note that some of the spatial phase patterns shown in FIG. 4B are binary phase patterns (i.e., phase patterns that can locally impose only one of two possible phase shifts, e.g., either 0 or $\pi$). In particular, phase patterns corresponding to the LP01, LP02, and LP03 modes are binary phase patterns. The remaining phase patterns shown in FIG. 4B are "analog" phase patterns because different portions of the pattern can impose phase shifts selected from a continuous phase-shift range. Analog phase patterns are shown in FIG. 4B using a color scheme, in which: (i) different colors represent different phase shifts in a continuous $2\pi$ interval and (ii) for some phase patterns, different bands of the same color represent phase shifts that differ from each other by an integer multiple of $2\pi$.

In one embodiment, OMC device 400 might employ a single, relatively large, continuous spatial-phase filter in place of two separate filters $420_1$ and $420_2$. This relatively large, continuous filter may be configured to display in its different sections (portions), two or more spatial-phase patterns from FIG. 4B. These different sections can be arranged so that one section serves as spatial-phase filter $420_1$ and another section serves as spatial-phase filter $420_2$.

Various additional OMC devices that can be used to implement SM coupler 120 and/or SM separator 164 (see FIG. 1) are disclosed, e.g., in the above-cited U.S. Patent Application Publication Nos. 2010/0329670 and 2010/0329671 and, also, in U.S. Patent Application Publication No. 2011/0243490 and U.S. patent application Ser. No. 12/986,468, both of which are incorporated herein by reference in their entirety.

Figure 5A:
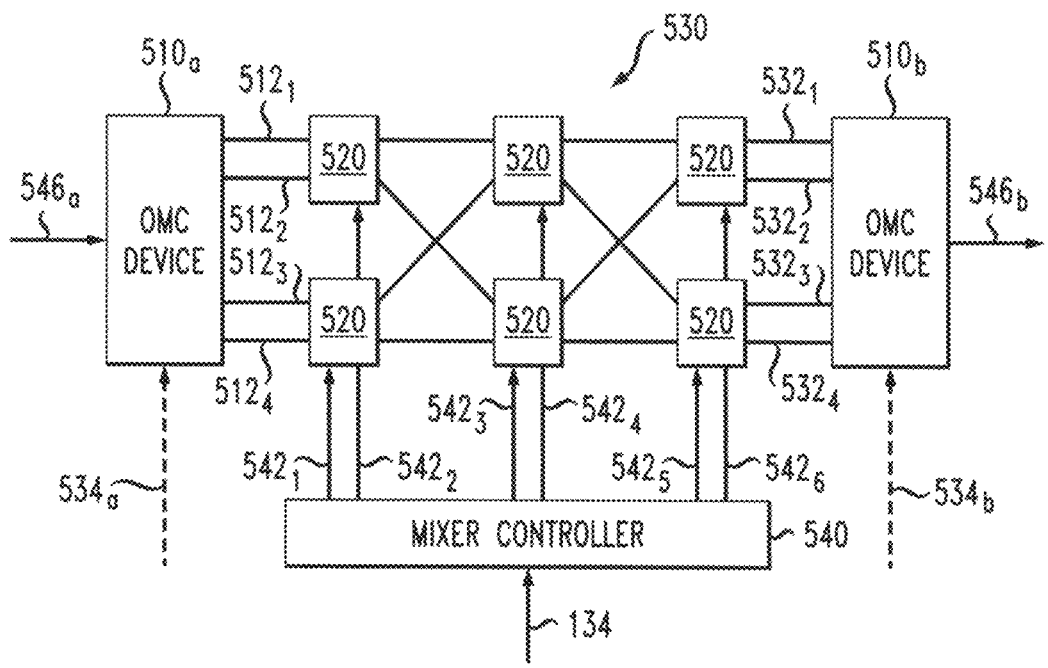
FIGS. 5A-5B illustrate an optical mode mixer that can be used in the system of FIG. 1 according to one embodiment of the disclosure.
Figure 5B:
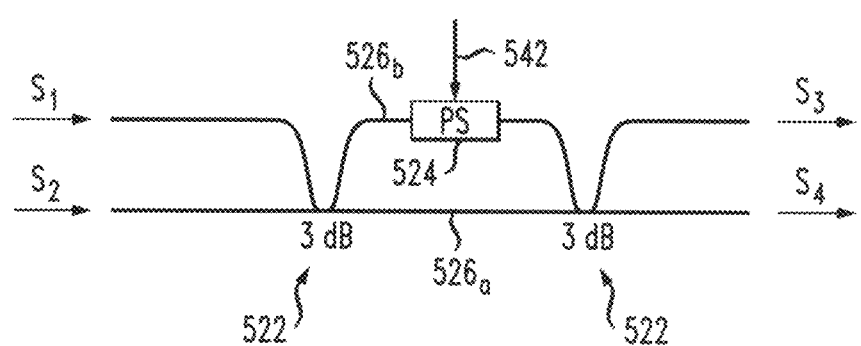

FIGS. 5A-5B illustrate an optical mode mixer 500 that can be used as optical mode mixer 150 (FIG. 1) according to one embodiment of system 100. More specifically, FIG. 5A shows an overall block diagram of mode mixer 500. FIG. 5B shows a schematic diagram of a 2×2 optical mixer 520, a plurality of which are used in mode mixer 500.

Referring to FIG. 5A, mode mixer 500 is coupled between multimode fibers 546a and 546b. In a representative configuration, multimode fiber 546a may be used to implement fiber-optic section 146a, and multimode fiber 546b may be used to implement fiber-optic section 146b (see FIG. 1). Optical mode mixer 500 comprises (i) OMC devices 510a and 510b coupled to multimode fibers 546a and 546b, respectively, and (ii) an interconnected array 530 of 2×2 optical mixers 520 coupled between these OMC devices as indicated in FIG. 5A. In one embodiment, each of OMC devices 510a and 510b may be analogous to OMC device 400 (FIG. 4) were it implemented for four instead of just two single-mode fibers 402.

Mixer array 530 is configured to (i) receive optical signals $512_1$-$512_4$ generated by OMC device 510a, (ii) optically mix the received signals to generate optical signals $532_1$-$532_4$, and (iii) apply the latter signals to OMC device 510b. As a result, mixer array 530 can be used to implement Eq. (1) with a (4×4) matrix M. The individual matrix elements of matrix M depend on the states of mixers 520, with the latter being controlled by control signals $542_1$-$542_6$ generated by a mixer controller 540. Therefore, matrix M can be varied as a function of time by configuring mixer controller 540 to change the state(s) of one or more mixers 520. Mixer controller 540 may be configured to generate control signals $542_1$-$542_6$ based on an external control signal, such as control signal 134 (FIG. 1). Alternatively, mixer controller 540 may be said to be part of controller 130, in which case control signal 134 may be said to comprise control signals $542_1$-$542_6$.

Referring to FIG. 5B, an individual optical mixer 520 comprises a Mach-Zehnder interferometer having a first arm 526a and a second arm 526b, with both arms coupled between two (e.g., 3-dB) optical couplers 522. Arm 526b includes a phase shifter (PS) 524 that receives a corresponding control signal 542 from controller 540. Each of output signals $S_3$ and $S_4$ produced by mixer 520 represents a linear combination of input signals $S_1$ and $S_2$ applied to the mixer, with the coefficients of the linear combination depending on (i) the wavelength of signals $S_1$ and $S_2$, (ii) the length difference (if any) between arms 526a and 526b, and (iii) the value of the phase shift imposed by phase shifter 524. The coefficients can be changed, as appropriate or necessary, by changing the value of the phase shift imposed by phase shifter 522.

Although array 530 is illustratively shown as having six mixers 520 interconnected in the manner indicated in FIG. 5A, other arrays may similarly be used. More specifically, the topology and/or size of array 530 may be selected, e.g., based on the values of $N_a$, $N_b$, L, and K specified for system 100. For example, if $N_a > N_b$, then some of the output lines analogous to output lines $532_i$ may not be connected to the corresponding OMC device analogous to OMC device 510b. If $N_a < N_b$, then some of the output lines analogous to output lines $532_i$ may need to be divided before being coupled into the corresponding ports the OMC device analogous to OMC device 510b.

Although exemplary embodiments of optical mode mixer 500 have been described as being based on optical mixers 520 of Mach-Zehnder type, other types of optical mixers or switches can similarly be used. For example, configurable switches/mixers having one or more than two input ports can be used to form a corresponding switch/mixer array analogous to array 530. Similarly, configurable switches/mixers having one or more than two output ports can also be used. One or both of OMC devices 510a-b may optionally be configurable, e.g., similar to SM coupler 120 and/or SM separator 164 (FIG. 1). The corresponding control signals are indicated in FIG. 5A using the dashed lines and labeled 534a and 534b. In alternative embodiments, OMC devices that are designed to address more or fewer than four spatial modes of the corresponding multimode fiber or fiber-optic cable may be used instead of OMC devices 510a-b. The OMC device located at the ingress (left) side of optical mode mixer 500 may be configured to address a different number of spatial modes than the OMC device located at the egress (right) side of the optical mode mixer.

Figure 6:
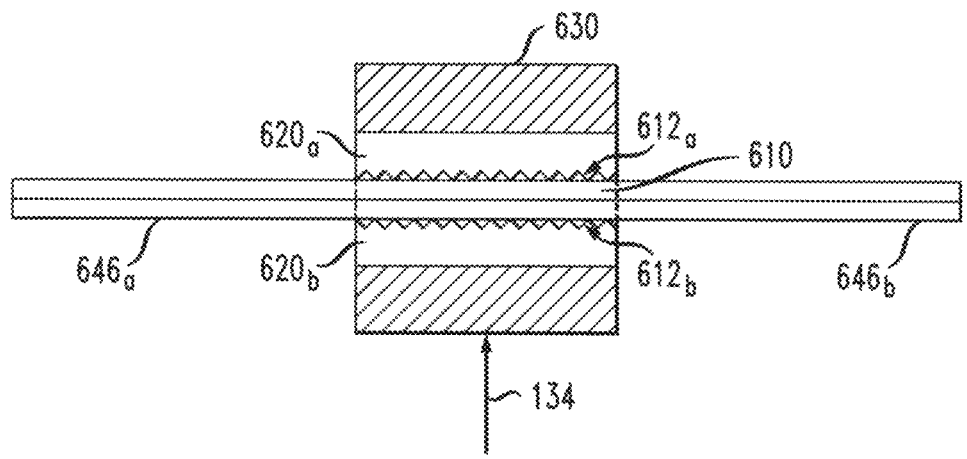
FIG. 6 shows a cross-sectional side view of an optical mode mixer that can be used in the system of FIG. 1 according to another embodiment of the disclosure.

FIG. 6 shows a cross-sectional side view of an optical mode mixer 600 that can be used as optical mode mixer 150 according to another embodiment of system 100. Optical mode mixer 600 is coupled between multimode fiber sections 646a and 646b. In a representative configuration, multimode fiber section 646a may be used to implement fiber-optic section 146a, and multimode fiber section 646b may be used to implement fiber-optic section 146b (see FIG. 1).

Optical mode mixer 600 has a mechanical (e.g., piezo-electric) actuator 630 arranged to press plates 620a-b against a section 610 of the fiber that is sandwiched between them. The force with which actuator 630 pushes on plates 620a-b is controlled by an external control signal, such as control signal 134 (see FIG. 1). Each of plates 620a-b has a respective uneven surface 612 that is in direct physical contact with fiber section 610. In one embodiment, surface 612 may be corrugated and/or have a relatively rough surface finish. When actuator 630 presses two uneven surfaces against fiber section 610, the fiber is micro-deformed, which causes relatively strong spatial-mode crosstalk and/or scrambling to occur in that fiber section. The type and/or extent of this spatial-mode crosstalk and/or scrambling depend on the magnitude of the mechanical force applied by actuator 630. In general, different mechanical deformations of the fiber produce different types and/or extents of spatial-mode crosstalk/scrambling in fiber section 610. This phenomenon, in turn, manifests itself as different spatial-mode mixing characteristics for mode mixer 600, e.g., as mathematically expressed by different matrices M in Eq. (1). Matrix M can therefore be varied as a function of time by configuring actuator 630 to vary the mechanical force that it applies to plates 620a-620b.

In one embodiment, optical mode mixer 600 may be implemented using an automated version of the fiber-mode scrambler that is commercially available from Newport Corporation of Irvine, Calif., e.g., as Model FM-1.

Referring back to FIG. 1, the operation of system 100 can be characterized by at least three different time constants: $t_s$, $T_{FEC}$, and $\tau_c$. More specifically, time constant $t_s$ is the duration of a signaling interval, e.g., the time period allocated to one constellation symbol in an individual optical signal 118. Period $t_s$ is inversely proportional to the bit rate. Time constant $T_{FEC}$ represents a maximum possible time duration for which a burst of errors may occur, with the operative FEC code still being able to correct the errors. The maximum amount of errors that the FEC code can correct is also referred to as the code's error correction capacity. The code's error correction capacity depends on the FEC block size, the post-encoding FEC scrambling depth, and the nature of the underlying algorithm(s). Time constant $\tau_c$ is the channel coherence time, which is a measure of the minimum time required for a magnitude change in optical signal 156 induced by multi-path fading in fiber-optic link 140 to become uncorrelated from its previous value (when the configurations of SM coupler 120 and optical mode mixer 150 are static).

An outage in system 100 may, for example, be caused by a "deep fade" of one or more signal components of optical signal 156, which may temporarily render optical signals 166 un-decodable due to a temporary breakdown in FEC-decoding processing performed by DSP 172. A deep fade of a signal component may be caused, e.g., by strong destructive interference experienced by that signal component at receiver 160 due to an unfavorable instantiation of channel matrix H (see Eq. (2)). When the cumulative effect of one or more deep fades that occur during transmission of an FEC-encoded block of data is such that a sufficiently large number of symbols in optical signals 166 have an insufficient optical signal-to-noise ratio (SNR) to be decoded correctly, the FEC-decoding processing breaks down, thereby causing an outage. Such a breakdown may occur, for example, when a deep fade lasts a relatively long period of time so that the corresponding errors exceed the code's error correction capacity. This may occur, e.g., if $\tau_c > T_{FEC}$.

Mathematically, fading can usually be modeled as a time-varying random process. The typical (e.g., average) duration of a deep fade can be expressed using channel coherence time $\tau_c$, with different modal components of optical signal 156 generally experiencing their respective deep fades in a statistically random manner. The random nature of fading causes some time intervals to have a relatively large number of signal components in deep fades and some other time intervals to have a relatively small number of signal components in deep fades. One of ordinary skill in the art will appreciate that a system outage is more likely to occur during one of the former time intervals than during one of the latter time intervals.

The methods of operating system 100 disclosed herein below are directed at reducing the frequency of temporary breakdowns in the FEC-decoding processing, e.g., by reducing the number of time intervals having a relatively large number of signal components in deep fades. In various embodiments, this reduction is achieved at the cost of (i) reducing the number of time intervals having a relatively small number of signal components in deep fades and/or (ii) using a portion of the bandwidth for monitoring the occurrence of deep fades rather than for transmitting payload data. A representative method of operating system 100 according to one embodiment may include one or more of: (i) changing the configuration of SM coupler 120, (ii) changing the configuration of SM separator 164, and (iii) changing the configuration of optical mode mixer 150.

Figure 7:
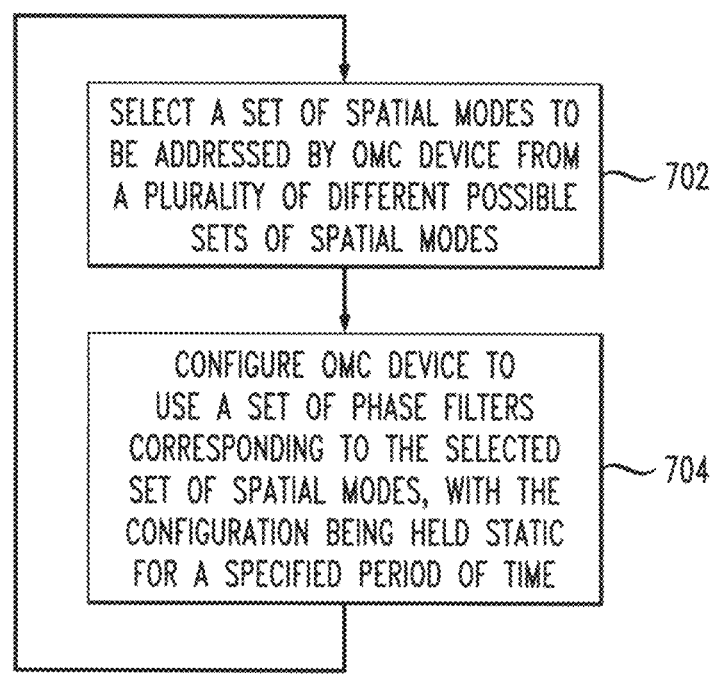
FIG. 7 shows a flowchart of a method of operating the system of FIG. 1 according to one embodiment of the disclosure.

FIG. 7 shows a flowchart of a method 700 of operating system 100 according to one embodiment of the disclosure. Method 700 may be implemented using transmitter 110 or receiver 160. Exemplary steps of method 700 are described below in reference to both FIG. 1 and FIG. 7.

At step 702 of method 700, controller 130 selects a subset of spatial modes to be addressed by the pertinent OMC device (e.g., SM coupler 120 or SM separator 164). For example, if method 700 is implemented using transmitter 110, then the selected subset consists of K spatial modes of fiber 146a, and there are $$\frac{N_a!}{K!(N_a-K)!}$$

different possible subsets from which this subset can be chosen, where ! indicates the factorial notation. If method 700 is implemented using receiver 160, then the selected subset consists of L spatial modes of fiber 146b, and there are $$\frac{N_b!}{L!(N_b-L)!}$$

different possible subsets from which this subset can be chosen. Controller 130 may employ any suitable algorithm for selecting a subset of spatial modes from the plurality of different possible subsets. For example, in one implementation of method 700, controller 130 may be configured to select a subset of spatial modes from the plurality of different possible subsets in a random manner. In another implementation, controller 130 may be configured to select a set of spatial modes from the plurality of different possible sets in a round-robin manner. In yet another implementation, controller 130 may be configured to select a set of spatial modes from the plurality of different possible sets by putting preference on certain modes that are known to result in less fading in the optical link due to the specifics of the employed fiber design(s). In yet another implementation, controller 130 may be configured to select a set of spatial modes from the plurality of different possible sets by choosing the modes that are either weakly or strongly coupled to each other, depending on the employed fiber design(s).

At step 704, controller 130 generates an appropriate control signal to configure the pertinent OMC device to use a set of phase filters (e.g., analogous to phase filters $420_1$-$420_2$, FIG. 4A) corresponding to the subset of spatial modes selected at step 702. For example, if the operative spatial modes are LP modes, then the phase filters used in the OMC device may have phase patterns appropriately selected from the phase patterns shown in FIG. 4B.

If method 700 is implemented using transmitter 110, then controller 130 generates control signal 132, which appropriately configures SM coupler 120 in step 704. If method 700 is implemented using receiver 160, then controller 130 generates control signal 136, which appropriately configures SM separator 164 in step 704.

The control signal (132 or 136) is generated so that it causes the configuration of the pertinent OMC device to remain static for a specified period of time ($t_{hold}$). In a representative embodiment, time $t_{hold}$ is selected to be significantly smaller than channel coherence time $\tau_c$, and also significantly smaller than time $T_{FEC}$. After time $t_{hold}$ has passed, the processing of method 700 is directed from step 704 back to step 702.

In various embodiments of method 700, steps 702 and 704 may be performed either asynchronously or synchronously with respect to the transmission of FEC-encoded blocks of data. Data-recovery algorithms executed by DSP 172 are made aware of the timing of steps 702 and 704 and perform the corresponding data processing accordingly.

In a representative embodiment, method 700 is implemented to cycle through steps 702 and 704 at a relatively high repetition rate, e.g., causing a relatively large number of cycles to be executed during transmission of one FEC-encoded block of data. This relatively fast cycling through steps 702 and 704 enables receiver 160 to be exposed to both favorable and unfavorable instantiations of channel matrix H (see Eq. (2)) during said transmission. Provided that the operative FEC code has sufficient error-correcting capacity for the corresponding average instantiation of channel matrix H, the FEC-decoding processing implemented in DSP 172 is typically capable of correcting the burst errors caused by the unfavorable instantiations of channel matrix H, which instantiations tend to be relatively short-lived due to the relatively fast cycling through steps 702-704. In contrast, without the relatively fast changes of channel matrix H imposed by method 700, an unfavorable instantiation of channel matrix H may last for a relatively long period of time, which may cause the FEC-decoding processing of the corresponding block of data to break down due to insufficient error-correcting capacity of the FEC code.

FIG. 8 shows a flowchart of a method 800 of operating system 100 according to another embodiment of the disclosure. Similar to method 700 (FIG. 7), method 800 may be implemented using the OMC device of transmitter 110 or receiver 160. Exemplary steps of method 800 are described below in reference to FIGS. 1, 7, and 8.

At step 802, controller 130 configures transmitter 110 and receiver 160 to enter a training mode. During the training mode, transmitter 110 is configured to transmit optical signals carrying one or more pilot-data sequences, and receiver 160 is configured to monitor the BER or other suitable performance metric corresponding to this transmission.

At step 804, controller 130 configures transmitter 110 or receiver 160 to perform method 700 (FIG. 7), while transmitter 110 is transmitting pilot-data sequences, and receiver 160 is monitoring a performance metric (e.g., the BER) corresponding to this transmission.

At step 806, DSP 172 identifies one or more time intervals corresponding to favorable performance-metric values (e.g., the minimum BER value) observed during step 804. DSP 172 then uses a feedback signal 174 to communicate this information to controller 130. Based on the received information, controller 130 identifies the corresponding one or more spatial-mode configurations of (e.g., one or more sets of phase filters used in) the pertinent OMC device. For example, if method 800 is implemented using SM coupler 120, then controller 130 identifies the one or more spatial-mode configurations of the SM coupler corresponding to said one or more time intervals of favorable performance-metric values observed during step 804. Alternatively, if method 800 is implemented using SM separator 160, then controller 130 identifies the one or more spatial-mode configurations of the SM separator corresponding to said one or more time intervals of favorable performance-metric values observed during step 804.

At step 808, controller 130 selects one configuration from the one or more spatial-mode configurations identified at step 806. Then, using an appropriate control signal (e.g., control signal 132 or 136), controller 130 configures the pertinent OMC device to use the selected spatial-mode configuration so that said configuration is being held static for the entire duration of step 810. As already indicated above, the pertinent OMC device may be SM coupler 120 or SM separator 164.

At step 810, controller 130 configures transmitter 110 and receiver 160 to operate in a payload-transmission mode for a specified period of time. During the payload-transmission mode, transmitter 110 is configured to transmit optical signals carrying payload data, and receiver 160 is configured to demodulate and decode the corresponding received signals to recover said payload data. Since the configuration selected at step 808 corresponds to a favorable instantiation of channel matrix H, the FEC-decoding processing in DSP 172 is likely to have sufficient error-correcting capacity to correct possible errors and to avoid a system outage during step 810.

In a representative implementation, the duration of step 810 is selected to be on the order of or slightly smaller than channel coherence time $\tau_c$. One of ordinary skill in the art will understand that this duration is likely to ensure that relatively favorable channel conditions can persist for the entire duration of step 810. After the period of time allocated to step 810 has passed, the processing of method 800 is directed from step 810 back to step 802.

One of ordinary skill in the art will appreciate that method 800 may beneficially be used in system 100, e.g., when fiber-optic link 140 has a relatively large value of channel coherence time $\tau_c$. The latter characteristic advantageously enables system 100 to spend a relatively small fraction of time in the training mode while being able to transmit a relatively large number of blocks of FEC-encoded payload data during each occurrence of step 810.

FIG. 9 shows a flowchart of a method 900 of operating system 100 according to yet another embodiment of the disclosure. Method 900 may be implemented using optical mode mixer 150 (FIG. 1). Exemplary steps of method 900 are described below in reference to FIGS. 1, 5, 6, and 9.

At step 902 of method 900, controller 130 selects an implementable set of values, each corresponding to a respective matrix element of mode-mixing matrix M (see Eq. (1)). Controller 130 may employ any suitable algorithm for selecting this implementable set of values. For example, in one implementation of method 900, controller 130 may be configured to randomly select this set from a list of pre-computed sets stored in a memory.

At step 904, based on the values selected at step 902, controller 130 generates control signal 134 that configures optical mode mixer 150 to adopt a configuration that implements the spatial-mode mixing corresponding to said selected values. For example, in one embodiment, control signal 134 may be used to configure mixer controller 540 to generate an appropriate set of control signals 542 for mixer array 530 (see FIG. 5). In another embodiment, control signal 134 may be used to specify the force to be applied by actuator 630 to plates 620*a*-*b* (see FIG. 6).

Control signal 134 is generated so that it causes the configuration of optical mode mixer 150 to remain static for a specified period of time ($t_{hold}$). In a representative embodiment, time $t_{hold}$ is selected to be significantly smaller than channel coherence time $\tau_c$, and also significantly smaller than time $T_{FEC}$. After time $t_{hold}$ has passed, the processing of method 900 is directed from step 904 back to step 902.

In various embodiments of method 900, steps 902 and 904 may be performed either asynchronously or synchronously with respect to the transmission of FEC-encoded blocks of data. Data-recovery algorithms executed by DSP 172 are made aware of the timing of steps 902 and 904 and perform the corresponding data processing accordingly.

In a representative embodiment, method 900 is implemented to cycle through steps 902 and 904 at a relatively high repetition rate, e.g., causing a relatively large number of cycles to be executed during transmission of one FEC-encoded block of data. This relatively fast cycling through steps 902 and 904 may reduce the outage probability for the reasons similar to those already indicated above in reference to method 700 (FIG. 7).

FIG. 10 shows a flowchart of a method 1000 of operating system 100 according to yet another embodiment of the disclosure. Method 1000 may be implemented using optical mode mixer 150. Exemplary steps of method 1000 are described below in reference to FIGS. 1, 9, and 10.

At step 1002, controller 130 configures transmitter 110 and receiver 160 to enter a training mode. During the training mode, transmitter 110 is configured to transmit optical signals carrying one or more pilot-data sequences, and receiver 160 is configured to monitor a suitable performance metric (e.g., the BER) corresponding to this transmission.

At step 1004, controller 130 configures optical mode mixer 150 to perform method 900 (FIG. 9), while transmitter 110 is transmitting pilot-data sequences, and receiver 160 is monitoring the performance metric corresponding to this transmission.

At step 1006, DSP 172 identifies one or more time intervals corresponding to favorable performance-metric values (e.g., the minimum BER value) observed during step 1004. DSP 172 then uses feedback signal 174 to communicate this information to controller 130. Based on the received information, controller 130 identifies the corresponding one or more spatial-mode mixing configurations of (e.g., one or more sets of implementable values for mode-mixing matrix M to be implemented by) optical mode mixer 150.

At step 1008, controller 130 selects one configuration from the one or more spatial-mode mixing configurations identified at step 1006. Then, using control signal 134, controller 130 configures optical mode mixer 150 to adopt the selected configuration so that said configuration is being held static for the entire duration of step 1010.

At step 1010, controller 130 configures transmitter 110 and receiver 160 to operate in a payload-transmission mode for a specified period of time. During the payload-transmission mode, transmitter 110 is configured to transmit optical signals carrying payload data, and receiver 160 is configured to demodulate and decode the corresponding received signals to recover said payload data. Since the configuration selected at step 1008 corresponds to a favorable instantiation of channel matrix H, the FEC-decoding processing in DSP 172 is likely to have sufficient error-correcting capacity to correct possible errors and to avoid a system outage during step 1010.

In a representative implementation, the duration of step 1010 is selected to be on the order of or slightly smaller than channel coherence time $\tau_c$. One of ordinary skill in the art will understand that this duration is likely to ensure that relatively favorable channel conditions can persist for the entire duration of step 1010. After the period of time allocated to step 1010 has passed, the processing of method 1000 is directed from step 1010 back to step 1002.

One of ordinary skill in the art will appreciate that method 1000 may beneficially be used in system 100, e.g., under conditions similar to those already indicated above in reference to method 800 (FIG. 8).

FIG. 11 shows a flowchart of a method 1100 of operating system 100 according to yet another embodiment of the disclosure. Method 1100 may be implemented using receiver 160. Exemplary steps of method 1100 are described below in reference to FIGS. 1 and 11.

At step 1102 of method 1100, receiver 160 is configured to use (L-R) of its L spatial-mode channels for data recovery and to use the remaining R of its L spatial-mode channels for testing the signal-propagation conditions in link 140. As used herein, the term "i-th spatial-mode channel" refers to the hardware in receiver 160 configured to generate optical signal 166$_i$ and electrical signal 170$_i$. In general, any of the L spatial-mode channels in receiver 160 can be a training channel or a data-recovery channel. Therefore, at any instant in time, a set of indices "i" representing the current set of R testing channels may have R different arbitrary index values selected from the range between 1 and L. The remaining (L-R) index values from this range then represent the data-recovery channels. In general, receiver 160 is configured so that the testing channels address spatial modes of fiber 146$b$ that are different from the spatial modes addressed by the data-recovery channels.

At step 1104, receiver 160 is configured to measure a suitable performance metric (e.g., the signal-to-noise ratio, SNR) corresponding to each of its L spatial-mode channels. Based on the measurement results, DSP 172 then sorts the spatial-mode channels into two groups. For example, the (L-R) channels having the highest SNR may be placed into the first group. The R remaining spatial-mode channels are placed into the second group.

At step 1106, receiver 160 is configured to use the first group of spatial-mode channels as data-recovery channels and the second group of spatial-mode channels as testing channels.

At step 1108, receiver 160 reconfigures SM separator 164 to change the spatial modes addressed by the testing channels, while leaving the spatial modes addressed by the data-recovery channels unchanged. Receiver 130 may employ any suitable algorithm for selecting a new subset of spatial modes for the testing channels. For example, in one implementation of method 1100, spatial modes for the new subset may be selected from currently unaddressed spatial modes (e.g., spatial modes that belong neither to the first group nor to the second group) in a random manner. The processing of method 1100 is then directed from step 1108 back to step 1104.

By cycling through steps 1104-1108, receiver 160 is able to adaptively change the spatial modes addressed by the data-recovery channels so that these spatial modes include at least some of the best performing spatial modes of fiber-optic link. As a result, the outage probability is advantageously reduced compared to that achieved in a static configuration. The cost of this reduction is that the bandwidth corresponding to the testing channels of receiver 160 is being used for scouting unaddressed spatial modes rather than for transmitting data.

While this disclosure has been described with reference to illustrative embodiments, this description is not intended to be construed in a limiting sense.

Although various embodiments of the disclosure have been described in reference to multimode fibers, similar principles are also applicable to multi-core fibers and/or fiber-optic cables.

A communication system may use an optical link having M modes, wherein N (<M) modes are being used for data transmission (e.g., when the processors can handle N×N MIMO). The remaining M-N modes may be used for scouting. In this configuration, the transmitter and/receiver address(es) all fiber modes, with a first subset of N modes being used for carrying information and a second subset of M-N modes being used for monitoring purposes. In one embodiment, one of the methods disclosed herein may be adapted to dynamically change the contents of the first and second subsets, e.g., by changing a mode designation from "carrying data" to "scouting," or vice versa.

As used herein, the term "performance metric" should be construed to encompass any suitable system-performance parameter, such as, without limitation, a BER, an SNR, a constellation quality measure, etc.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "controllers" or "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An optical system, comprising:
an optical-mode-coupling (OMC) device configured to address a first subset of spatial modes of an optical link;
a controller configured to reconfigure the OMC device to address a second subset of spatial modes of the optical link during transmission of an optical signal carrying an FEC-encoded block of data through said OMC device and said optical link, wherein the second subset differs from the first subset by one or more spatial modes; and
an FEC encoder configured to generate a plurality of data streams carrying the FEC-encoded block of data;
wherein the OMC device is configured to address the first subset of spatial modes during a portion of the transmission of the optical signal carrying said FEC-encoded block of data and is configured to address the second subset of spatial modes during another portion of the transmission of the optical signal carrying said FEC-encoded block of data; and
wherein the controller is configured to cause the OMC device to change the addressing of the spatial modes at a rate that is greater than an inverse of a channel coherence time corresponding to the optical link.

2. The optical system of claim 1, wherein:
the optical link comprises a multimode fiber, a multi-core fiber, or a fiber-optic cable; and
the OMC device is configured to address a subset of spatial modes of said multimode fiber, multi-core fiber, or fiber-optic cable.

3. The optical system of claim 1, wherein the OMC device is a spatial-mode coupler of an optical transmitter.

4. The optical system of claim 3, further comprising:
an E/O converter configured to convert said plurality of data streams into a plurality of modulated optical signals, wherein:
the controller is configured to cause the spatial-mode coupler to change one or more spatial modes in the first subset during transmission through said spatial-mode coupler of said plurality of modulated optical signals; and
the spatial-mode coupler is configured to couple each of the modulated optical signals of said plurality into a corresponding spatial mode of the optical link belonging to a currently addressed subset.

5. The optical system of claim 4, wherein the FEC encoder is configured to employ an FEC code having an FEC block size that causes duration of said transmission of the modulated optical signals carrying the FEC-encoded block of data to be shorter than the channel coherence time.

6. The optical system of claim 1, wherein the OMC device is a spatial-mode separator of an optical receiver.

7. The optical system of claim 6, wherein:
the optical signal carrying the FEC-encoded block of data is an optical SDM signal received from said optical link;
the spatial-mode separator is configured to convert the optical SDM signal into a plurality of modulated optical signals, each of said modulated optical signals corresponding to a respective spatial mode from a currently addressed subset; and
the optical system further comprises:
an O/E converter configured to convert the plurality of modulated optical signals into a corresponding plurality of streams of digital samples; and
a digital signal processor configured to process the plurality of streams of digital samples to recover data encoded in the FEC-encoded block of data.

8. The optical system of claim 1, wherein the controller is configured to:
randomly select a first spatial mode from a currently addressed subset;
randomly select a second spatial mode outside of the currently addressed subset; and
cause the OMC device to address the second spatial mode instead of the first spatial mode.

9. A method comprising:
configuring a controller to cause an optical-mode-coupling (OMC) device to address spatial modes of an optical link; and
coupling the OMC device to the controller to provide a control signal adapted to operate the OMC device to address a first subset and a second subset of spatial modes of the optical link such that, in an event of an optical signal carrying an FEC-encoded block of data being transmitted through the OMC device, the OMC device addresses the first subset of spatial modes during a portion of the transmission of the optical signal carrying said FEC-encoded block of data and addresses the second subset of spatial modes during another portion of the transmission of the optical signal carrying said FEC-encoded block of data; and wherein said controller is further configured to cause the OMC device to change spatial modes at a rate that is greater than an inverse of a channel coherence time corresponding to said optical link, and to select the rate so as to subject at least a portion of the optical signal carrying the FEC-encoded block of the data to an effective state of the optical link that approximates an average state of the optical link.

10. An optical system, comprising:
an optical-mode-coupling (OMC) device configured to address a first subset of spatial modes of an optical link; and
a controller configured to reconfigure the OMC device to address a second subset of spatial modes of the optical link for transmission of an optical signal carrying data through said OMC device and said optical link, wherein the second subset differs from the first subset by one or more spatial modes, wherein:
the optical system is configured to monitor a performance metric during transmission through said OMC device and the optical link of an optical signal carrying a pilot data sequence; and
the controller is configured to select the second subset of the spatial modes based on the monitored performance metric and configure the OMC device to address the second subset of the spatial modes during transmission through said OMC device and said optical link of an optical signal carrying payload data.

11. The optical system of claim 10, wherein the controller is further configured to cause the OMC device to keep the second subset unchanged until a transmission through said OMC device and said optical link of a next optical signal carrying a pilot data sequence.

12. An optical system, comprising:
an optical-mode-coupling (OMC) device configured to address a first subset of spatial modes of an optical link, wherein the OMC device is a spatial-mode separator of an optical receiver;
a controller configured to reconfigure the OMC device to address a second subset of spatial modes of the optical link for transmission of an optical signal carrying data through said OMC device and said optical link, wherein the second subset differs from the first subset by one or more spatial modes, wherein the spatial-mode separator is configured to convert an optical SDM signal received from said optical link into a plurality of modulated optical signals, each of said modulated optical signals corresponding to a respective spatial mode from a currently addressed subset;
an O/E converter configured to convert the plurality of modulated optical signals into a corresponding plurality of streams of digital samples; and
a digital signal processor configured to process the plurality of streams of digital samples to recover data carried by the optical SDM signal, wherein:
at sorting times, the optical receiver is configured to sort the spatial modes of the currently addressed subset into a first group and a second group based on SNR values of the corresponding modulated optical signals such that the first group has higher SNR values than the second group;
the digital signal processor is configured to recover the data carried by the optical SDM signal based on the streams of digital samples corresponding to the first group of spatial modes; and
between two consecutive sorting times, the controller is configured to cause the spatial-mode separator to change one or more spatial modes in the second group of spatial modes while keeping the first group of spatial modes unchanged.

13. The optical system of claim 12, wherein the controller is configured to:
select a first spatial mode in the second group corresponding to a lowest SNR value therein;
randomly select a second spatial mode outside of the currently addressed subset of spatial modes; and
cause the spatial-mode separator to address the second spatial mode instead of the first spatial mode.

14. A method comprising:
configuring a controller to cause an optical-mode-coupling (OMC) device to address a first subset of spatial modes of an optical link;
configuring the controller to operate the OMC device to change one or more spatial modes in the first subset to cause the OMC device to address a second subset of spatial modes of the optical link for transmission of an optical signal carrying payload data through said OMC device and said optical link;
configuring the controller to monitor a performance metric received during transmission through said OMC device and said optical link of an optical signal carrying a pilot data sequence;
configuring the controller to select the second subset of the spatial modes based on the performance metric; and
configuring the controller to operate the OMC device to address the second subset during the transmission through said OMC device and said optical link of the optical signal carrying the payload data.

15. A method comprising:
configuring a controller to operate an optical-mode-coupling (OMC) device to address a first subset of spatial modes of an optical link;
configuring the controller to operate the OMC device to change one or more spatial modes in the first subset to cause the OMC device to address a second subset of spatial modes of the optical link for transmission of an optical SDM signal carrying data through the OMC device and said optical link;
configuring the controlling to sort, at sorting times, the spatial modes of a currently addressed subset into a first group and a second group based on SNR values of modulated optical signals, each of said modulated optical signals corresponding to the optical SDM signal and a respective spatial mode from the currently addressed subset, such that the first group has higher SNR values than the second group; and
configuring the controller to operate the OMC device to change, between two consecutive sorting times, one or more spatial modes in the second group of spatial modes while keeping the first group of spatial modes unchanged.

* * * * *